United States Patent
Karino et al.

(10) Patent No.: US 8,004,965 B2
(45) Date of Patent: Aug. 23, 2011

(54) REDUNDANT PACKET SWITCHING SYSTEM AND SYSTEM SWITCHING METHOD OF REDUNDANT PACKET SWITCHING SYSTEM

(75) Inventors: Shuichi Karino, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 739 days.

(21) Appl. No.: 11/576,131

(22) PCT Filed: Aug. 31, 2005

(86) PCT No.: PCT/JP2005/016375
§ 371 (c)(1),
(2), (4) Date: Jun. 21, 2007

(87) PCT Pub. No.: WO2006/035575
PCT Pub. Date: Apr. 6, 2006

(65) Prior Publication Data
US 2008/0008169 A1    Jan. 10, 2008

(30) Foreign Application Priority Data
Sep. 28, 2004  (JP) ................................ 2004-281521

(51) Int. Cl.
*G01R 31/08* (2006.01)
(52) U.S. Cl. ........................................ 370/220; 370/221
(58) Field of Classification Search .................. None
See application file for complete search history.

(56) References Cited

U.S. PATENT DOCUMENTS

| | | | |
|---|---|---|---|
| 5,473,599 A * | 12/1995 | Li et al. .......................... | 370/219 |
| 5,781,530 A * | 7/1998 | Segal ............................. | 370/220 |
| 5,781,715 A * | 7/1998 | Sheu ............................. | 714/4.3 |
| 5,835,696 A | 11/1998 | Hess | |
| 6,425,009 B1 * | 7/2002 | Parrish et al. .................. | 709/224 |
| 6,594,229 B1 * | 7/2003 | Gregorat ....................... | 370/219 |

(Continued)

FOREIGN PATENT DOCUMENTS

JP    2000-354040 A    12/2000

(Continued)

OTHER PUBLICATIONS

Hinden, "Virtual Router Redundancy Protocol (VRRP)", RFC 3768, Apr. 2004, Retrieved from the Internet URL:http://www.ietf.org/rfc/rfc3768.txt?number=3768.

(Continued)

*Primary Examiner* — Chi H Pham
*Assistant Examiner* — Kouroush Mohebbi
(74) *Attorney, Agent, or Firm* — Sughrue Mion, PLLC

(57) ABSTRACT

From a time point of last confirmation of operation of the working device 51 until a time point of next confirmation, the standby device 52 receives the same packet as that whose transfer processing is executed by the working device from the interface units 521-1~521-*n*, processes the packet by the transfer unit 522 and holds the processed packet in the accumulation units 525-1~525-*n*. The device monitors an operation state of the working device 51 by an advertisement transmitted by the working device 51 and upon reception of the advertisement, responsively abandons the packet held in the accumulation units 525-1~525-*n*. When determining that the working device 51 stops by non-arrival of an advertisement for a predetermined time period, the device sends out the packet held in the accumulation units 525-1~525-*n* and switches processing so as to itself operate as a working device.

30 Claims, 17 Drawing Sheets

U.S. PATENT DOCUMENTS

| | | | |
|---|---|---|---|
| 6,704,278 B1 * | 3/2004 | Albert et al. | 370/216 |
| 6,954,436 B1 * | 10/2005 | Yip et al. | 370/254 |
| 7,116,634 B1 * | 10/2006 | Hanselmann | 370/219 |
| 7,200,107 B2 * | 4/2007 | Kloth | 370/220 |
| 7,227,838 B1 * | 6/2007 | O'Riordan | 370/219 |
| 7,313,089 B2 * | 12/2007 | Moller et al. | 370/219 |

FOREIGN PATENT DOCUMENTS

| | | |
|---|---|---|
| JP | 2001-333098 A | 11/2001 |
| JP | 2003-8620 A | 1/2003 |
| JP | 2003-244197 A | 8/2003 |
| JP | 2004-186802 A | 7/2004 |
| WO | WO 95/29544 A1 | 11/1995 |
| WO | WO 98/54923 A1 | 12/1998 |

OTHER PUBLICATIONS

Karina et al., "Scalable na Router Clustering Hoshiki no Teian", 2004 Nen The Institute of Electronic, Information and Communication Engineers Tsushin Society Taikai Koen Ronbunshu 2, Sep. 8, 2004, B-6-86.

"Virtual Router Redundancy Protocol (VRRP) White Paper", White Paper Nortel Networks, Jan. 1, 2000 pp. 1-12, XP 002253293.

* cited by examiner

REDUNDANT PACKET SWITCHING SYSTEM AND SYSTEM SWITCHING METHOD OF REDUNDANT PACKET SWITCHING SYSTEM

FIELD OF THE INVENTION

The present invention relates to a redundant packet switching system and, more particularly, to a packet switching system which prevents packet missing at the time of system switchover.

DESCRIPTION OF THE RELATED ART

Conventional redundant packet switching system of this kind, as shown in, for example, Japanese Patent Laying-Open No. 2001-333098 (hereinafter referred to as Literature 1), is used for improving availability of a network by making a network relay device be redundant.

With reference to Literature 1, the packet switching device recited in the literature is provided with two packet processing devices capable of executing the same processing, each of which processes a packet applied from a line termination section on the upstream side.

Before the processed packets are transmitted to a line termination section on the downstream side, a packet processed on a standby side by selection processing by a changeover control section will be abandoned and one for the working side will be sent out.

The packet switching device recited in Literature 1 is provided with an SYNC signal generator which controls the device to execute packet switching processing at the same timing in response to a clock signal applied from a clock signal generator shared by both devices (recited in FIG. 2 in Literature 1).

By using the unit, a packet applied from the line termination section on the upstream side is processed by each packet switching device at the same timing and transferred to a transmission channel termination section on the sender side.

This enables packet missing at the time of switchover to be prevented even when a working system is switched between a 0 system and a 1 system because there is no missing of packets sent out before and after the switchover.

Thus, conventional redundant packet switching systems are designed such that the respective redundant devices execute processing while synchronizing an operation state and timing with each other in order to prevent packet missing.

On the other hand, as a simpler redundant packet switching system involving no synchronous processing, there is, for example, a system shown in Virtual Router Redundancy Protocol (VRRP). R. Hinden, Ed. April 2004. RFC3768 (hereinafter referred to as Literature 2). With reference to FIG. 1, the VRRP system recited in Literature 2 will be described.

More specifically, in the VRRP, m-sets of router devices 11-1 to 11-*m* capable of executing the same processing are connected in parallel to data links 121 and 122 to behave as a single router device 110 for adjacent nodes 131 and 132.

Ordinarily, only one of them (the master 11-1) executes processing and the other devices (the backups 11-2 to 11-*m*) monitor whether the master 11-1 is active or inactive. When the master 11-1 stops the processing, one of the backups 11-2 to 11-*m* switches its operation to behave as a master. This realizes redundancy.

Furthermore, shown in FIG. 2 is a detailed structure of a master device 21 and a backup device 22. The respective router devices 21 and 22 include interface units 211-1 to 211-*n* and 221-1 to 221-*n*, respectively, which are connected to single multi-access data links 23-1 to 23-*n*.

In addition, the master device 21, which includes an advertisement unit 213, transmits an advertisement indicating that the device itself operates to the data links 23-1 to 23-*n* through the interface units 211-1 to 211-*n* at predetermined intervals. The advertisement unit 213 includes an advertisement timer 214 for controlling a transmission interval.

In addition, the backup device 22, which includes a monitoring unit 222, monitors activeness/inactiveness of the master by an advertisement arriving from the master device 21. The monitoring unit 222 includes a monitoring timer 223 for measuring an arrival interval.

Each of the router devices 21 and 22 holds the following values as parameters.

a) An identifier VRID of a virtual router made redundant is held. Router devices having the same VRID form one virtual router. VRID is a natural number less than 256.

b) Processing priority of each of the router devices 21 and 22 is held. According to Priority, processing priority is given to each router in the virtual router. Priority is a value of an integral number not less than 0 and less than 256 and the larger it becomes, the higher priority it indicates. A router device having the numerical value of 0255 behaves as a master.

c) Each of the router devices 21 and 22 has an advertisement transmission interval Advertisement_Interval and an initial value of the activeness/inactiveness timer Master_Down_Interval.

d) Each of the router devices 21 and 22 has an IP address IA to be assigned to a virtual router made redundant.

Each of the router devices 21 and 22 obtains a virtual MAC address from the VRID according to the following expression.

$$0:0:5e:0:1:\text{VRID} \tag{1}$$

The MAC address is set at the interface units 211-1 to 211-*n* and 221-1 to 221-*n* by the respective router devices 21 and 22 so as to be received by all the router devices 21 and 22 belonging to one virtual router. The IP address IA assigned to a redundant router is in practice set at the interface units 211-1 to 211-*n* only by the master device 21. The master device 21 responds, with a virtual MAC address, to an ARP request from an adjacent device having the IP address IA as a target.

The master device 21 has its priority set to 255 in advance. The backup device 22 has its priority set to be other than 255 in advance. The master device 21 transmits an advertisement indicating that itself is in operation to the data link at predetermined intervals. For the transmission, IP multicast is used and a destination group is 224.0.0.18. The backup device 22 receives a packet directed to that group and the monitoring unit 222 resets the monitoring timer 223 to an initial value.

The master device 21 transfers a packet contained in a data link frame directed to a virtual MAC address. Even receiving a frame directed to the virtual MAC address, the backup device 22 abandons the frame without transferring the same.

Unless an advertisement from the master device 21 is received within the Master_Down_Interval, the backup device 22 senses a stop of the master device 21. Upon sensing a stop of the master device 21, the backup device 22 switches its operation to behave as a master. More specifically, the device transmits an advertisement at predetermined advertisement intervals, sets an IP address of a redundant router at an interface and transfers a packet directed to the virtual MAC address without abandonment.

When there exist a plurality of backup devices 22, a device having the highest priority among them switches to a master device.

According to the present system, a router identified by a single virtual MAC address by an adjacent node is formed of a plurality of router devices and even when a master device stops, a backup device is allowed to continue the processing by succeeding the processing.

System similar to the redundant packet switching system recited in Literature 2 is also recited in Japanese Patent-Laying Open No. 2003-244197 (hereinafter referred to as Literature 3). The redundant packet switching system recited in Literature 3 includes a packet transfer unit having a dual construction and an IP routing protocol processing unit, with a working-system packet transfer unit executing packet transfer based on setting of a routing table and a standby-system packet transfer unit, while executing no packet transfer, being on standby to start packet transfer immediately when switchover of the packet transfer unit occurs due to a failure of the working-system packet transfer unit (see the paragraph 0016).

Such a redundant packet switching system having no synchronous processing unit between a working system and a standby system as shown in Literature 2 has a problem of a loss of a packet to be transferred during switchover of a device in operation. The reason is that in a period from when the master device stops until when the switching processing ends (at maximum, the period of Master_Down_Interval), packet transfer is interrupted and a packet contained in a frame sent directed to the virtual MAC address in the period will be transferred by none of the router devices.

With reference to FIG. 3, for example, a packet 332 sent out to a router device made redundant is received by none of the devices during a period from when a working device 31 stops until when a standby device 32 senses the stop.

This is also the case with the redundant packet switching system recited in Literature 3, and because there occurs not a small time difference between a time of detection of a failure of the packet transfer unit of the working system and a time of switchover of the packet transfer unit, there arises a packet which will not be transferred by any device at the time of system switchover.

Another problem will be caused due to a packet loss during switchover of a device in operation. More specifically, performance of a higher layer protocol by which a relevant packet is transmitted, e.g. TCP, will be degraded. The reasons are that the relevant packet will not be transmitted until a TCP retransmission timer times out and that TCP controls congestion due to retransmission to execute processing of reducing a sending-out band.

Such a structure as shown in Literature 1 in which redundant devices execute processing while synchronizing an operation state and timing in order to prevent packet missing at the time of system switchover has a problem that a device packaging scale is enlarged to increase a cost. Demanded accordingly is a technique for preventing missing of a packet at the time of system switchover in such a redundant packet switching system of a simple structure without a synchronous processing unit between a working system and a standby system as shown in Literature 2.

An object of the present invention is to provide a redundant packet switching system capable of preventing missing of a packet to be transferred during switchover of a device in operation with a simple structure and a system switching method thereof.

Another object of the present invention is to prevent performance degradation due to redundant system switchover in a higher layer protocol such as TCP in which performance degradation due to packet loss is conspicuous.

SUMMARY OF THE INVENTION

According to a first redundant packet switching system of the present invention, the redundant packet switching system, comprising working system switching device and standby system packet switching device which are connected to the same data link, wherein said standby system packet switching device includes an accumulation unit which accumulates a packet as a target of transfer until operation of said working system packet switching device is confirmed, and when an operation stop of said working system packet switching device is detected, executes processing of transferring a packet accumulated in said accumulation unit and a packet newly received from said data link by switching the packet switching device itself to the working system.

According to a second redundant packet switching system of the present invention, the redundant packet switching system, comprising working system packet switching device and standby system packet switching device which are connected to the same data link, wherein said working system packet switching device including an interface unit which transmits and receives a packet to/from said data link, a transfer unit which analyzes a packet received from said data link through the interface unit to transmit a packet as a target of transfer to said data link through said interface unit on a sending-out route, and an advertisement unit which transmits an advertisement message indicating that the device itself is in operation to said data link through said interface unit in a predetermined cycle, said standby system packet switching device including an interface unit which transmits and receives a packet to/from said data link, an accumulation unit which temporarily accumulates a packet to be transmitted to said data link through the interface unit, a transfer unit which analyzes a packet received from said data link through said interface unit to output a packet as a target of transfer to said accumulation unit, and a monitoring unit which abandons a packet accumulated in said accumulation unit at every reception of said advertisement message through said interface unit, and upon sensing that reception of said advertisement message ceases, transmits a packet accumulated in said accumulation unit and a packet newly received from said data link through said interface unit to said data link through said interface unit on a sending-out route by switching the packet switching device itself to the working system.

According to a third redundant packet switching system of the present invention, the redundant packet switching system, comprising working system packet switching device and standby system packet switching device which are connected to the same data link, wherein said working system packet switching device including an interface unit which transmits and receives a packet to/from said data link, a transfer unit which analyzes a packet received from said data link through the interface unit to transmit a packet as a target of transfer to said data link through said interface unit on a sending-out route, and an advertisement which transmits an advertisement message indicating that the device itself is in operation to said data link through said interface unit in a predetermined cycle, and said standby system packet switching device including an interface unit which transmits and receives a packet to/from said data link, an accumulation unit which temporarily accumulates a packet received from said data link through the interface unit with information about a reception time added, a monitoring unit which abandons at every reception of an advertisement message from said working system packet switching device through said interface unit, a packet whose reception time is before a time obtained by going back from a reception time of said advertisement message by a time period required for transfer processing of said working system packet switching device among packets accumulated in said accumulation unit, and upon sensing that reception of an advertisement message ceases, switching the packet switching device itself to the working system, and a transfer unit which analyzes a packet accumulated in said accumulation unit when the packet switching device itself switches to the working system and a packet newly received from said data link through said interface unit to output a packet as a target of transfer to said interface unit on a sending-out route.

According to a fourth redundant packet switching system of the present invention, said standby system packet switching device includes a packet monitoring unit for monitoring a frame sent out to said data link by said working system packet switching device to delete the same packet as a packet as a target of transfer which is stored in said frame from said accumulation unit.

According to a fifth redundant packet switching system of the present invention, said standby system packet switching device includes an advertisement unit for transmitting an advertisement message indicating that the device itself is in operation to said data link through said interface unit in a predetermined cycle, and which further comprises at least one other packet switching device for monitoring an advertisement message from said standby system packet switching device, wherein a packet switching device having the highest priority among said other packet switching devices causes the packet switching device itself to operate as said standby system packet switching device upon sensing that an advertisement message from said standby system packet switching device ceases.

According to a sixth redundant packet switching system of the present invention, said standby system packet switching device includes an accumulation rule holding unit for holding an accumulation rule for discriminating a packet to be accumulated in said accumulation unit and accumulates only a packet satisfying said accumulation rule.

According to a first system switching method of a redundant packet switching system of the present invention, the system switching method of a redundant packet switching system including working system packet switching device and standby system packet switching device which are connected to the same data link, the method comprising the steps of:

at said standby system packet switching device accumulating a packet as a target of transfer in an accumulation unit until operation of said working system packet switching device is confirmed, and when an operation stop of said working system packet switching device is detected, executing processing of transferring a packet accumulated in said accumulation unit and a packet newly received from said data link switches the packet by switching device itself to the working system.

According to a second system switching method of a redundant packet switching system of the present invention, the system switching method of a redundant packet switching system including working system packet switching device and standby system packet switching device which are connected to the same data link, the method comprising the steps of:

at said working system packet switching device along with transfer processing of analyzing a packet received from said data link through an interface unit which transmits and receives a packet to/from said data link and transmitting a packet as a target of transfer to said data link through said interface unit on a sending-out route, transmitting an advertisement message indicating that the device itself is in operation to said data link through said interface unit in a predetermined cycle, and at said standby system packet switching device analyzing a packet received from said data link through said interface unit which transmits and receives a packet to/from said data link, accumulating a packet as a target of transfer in said accumulation unit, abandoning a packet accumulated in said accumulation unit at every reception of said advertisement message through said interface unit, upon sensing that reception of said advertisement message ceases, switching the packet switching device itself to the working system, and transmitting a packet accumulated in said accumulation unit and a packet newly received from said data link through said interface unit to said data link through said interface unit on a sending-out route.

According to a third system switching method of a redundant packet switching system of the present invention, the system switching method of a redundant packet switching system including working system packet switching device and standby system packet switching device which are connected to the same data link, the method comprising the steps of:

at said working system packet switching device along with transfer processing of analyzing a packet received from said data link through an interface unit which transmits and receives a packet to/from said data link and transmitting a packet as a target of transfer to said data link through said interface unit on a sending-out route, transmitting an advertisement message indicating that the device itself is in operation to said data link through said interface unit in a predetermined cycle, and at said standby system packet switching device accumulating a packet received from said data link through an interface unit which transmits and receives a packet to/from said data link with information about a reception time added, abandoning at every reception of an advertisement message from said working system packet switching device through said interface unit, a packet whose reception time is before a time obtained by going back from a reception time of said advertisement message by a time period required for transfer processing of said working system packet switching device among packets accumulated in said accumulation unit, and upon sensing that reception of an advertisement message ceases, switching the packet switching device itself to the working system, and analyzing a packet accumulated in said accumulation unit and a packet newly received from said data link through said interface unit to output a packet as a target of transfer to said interface unit on a sending-out route.

According to a fourth system switching method of a redundant packet switching system of the present invention, said standby system packet switching device monitors a frame sent out to said data link from said working system packet switching device to delete the same packet as a packet as a target of transfer which is stored in said frame from said accumulation unit.

According to a fifth system switching method of a redundant packet switching system of the present invention, said standby system packet switching device transmits an advertisement message indicating that the device itself is in operation to said data link through said interface unit in a predetermined cycle, at least one other packet switching device monitors an advertisement message from said standby system packet switching device, and a packet switching device having the highest priority among said other packet switching devices causes the packet switching device itself to operate as said standby system packet switching device upon sensing that an advertisement message from said standby system packet switching device ceases.

According to a sixth system switching method of a redundant packet switching system of the present invention, said standby system packet switching device determines whether packet accumulation into said accumulation unit is allowed or not with reference to an accumulation rule for discriminating a packet to be accumulated which is held in an accumulation rule holding unit.

According to a first packet switching device of the present invention, a packet switching device, comprises an accumulation unit which accumulates a packet as a target of transfer until operation of a working system packet switching device connected to a data link is confirmed, which upon detection of an operation stop of said working system packet switching device, executes processing of transferring a packet accumulated in said accumulation unit and a packet newly received from said data link by switching the packet switching device itself to the working system.

According to a second packet switching device of the present invention, the packet switching device, comprises an interface unit which transmits and receives a packet to/from a data link to which a working system packet switching device is connected, an accumulation unit which temporarily accumulates a packet to be transmitted to said data link through the interface unit, a transfer unit which analyzes a packet received from said data link through said interface unit to output a packet as a target of transfer to said accumulation unit, and a monitoring unit which abandons a packet accumulated in said accumulation unit at every reception of an advertisement message periodically transmitted to said data link from said working system packet switching device through said interface unit, and upon sensing that reception of said advertisement message ceases, transmits a packet accumulated in said accumulation unit and a packet newly received from said data link through said interface unit to said data link through said interface unit on a sending-out route by switching the packet switching device itself to the working system.

According to a third packet switching device of the present invention, the packet switching device, comprises an interface unit which transmits and receives a packet to/from a data link to which a working system packet switching device is connected, an accumulation unit which temporarily accumulates a packet received from said data link through the interface unit with information about a reception time added, a monitoring unit which abandons at every reception of an advertisement message periodically transmitted from said working system packet switching device through said interface unit, a packet whose reception time is before a time obtained by going back from a reception time of said advertisement message by a time period required for transfer processing of said working system packet switching device among packets accumulated in said accumulation unit, and upon sensing that reception of an advertisement message ceases, switches the packet switching device itself to the working system, and a transfer unit which analyzes a packet accumulated in said accumulation unit when the packet switching device itself switches to the working system and a packet newly received from said data link through said interface unit to output a packet as a target of transfer to said interface unit on a sending-out route.

According to a fourth packet switching device of the present invention, the packet switching device comprises a packet monitoring unit which monitors a frame sent out to said data link by said working system packet switching device to delete the same packet as a packet as a target of transfer which is stored in said frame from said accumulation unit.

According to a fifth packet switching device of the present invention, the packet switching device exchanges priority information with other standby system packet switching device and only when the packet switching device itself has the highest priority among standby system packet switching devices, switches operation to behave as a working system packet switching device at an operation stop of said working system packet switching device.

According to a sixth packet switching device of the present invention, the packet switching device comprises an accumulation rule holding unit which holds an accumulation rule for discriminating a packet to be accumulated in said accumulation unit, wherein only a packet satisfying said accumulation rule is accumulated.

According to the present invention, a packet switching device of a standby system accumulates a packet being processed in an accumulation unit until subsequent confirmation of operation of a packet switching device of a working system and when operation stop of the packet switching device of the working system is detected, switches the packet switching device itself over to the working system to transfer the packet accumulated in the accumulation unit and a packet newly received from a data link. Therefore, as shown in FIG. 4, for example, a packet 432 sent out toward a redundant packet switching system in a period from a time point when a packet switching device 41 of a working system stops until when a packet switching device 42 of a standby system senses the stop is received by the packet switching device 42 of the standby system and accumulated in an accumulation unit, and sent out upon sensing of the stop of the packet switching device 41 of the working system, so that missing of a packet at the time of system switchover can be prevented.

DESCRIPTION OF THE PREFERRED EMBODIMENT

Next, best modes for implementing the present invention will be described in detail with reference to the drawings.

First Composition of Embodiment

Figure 1:
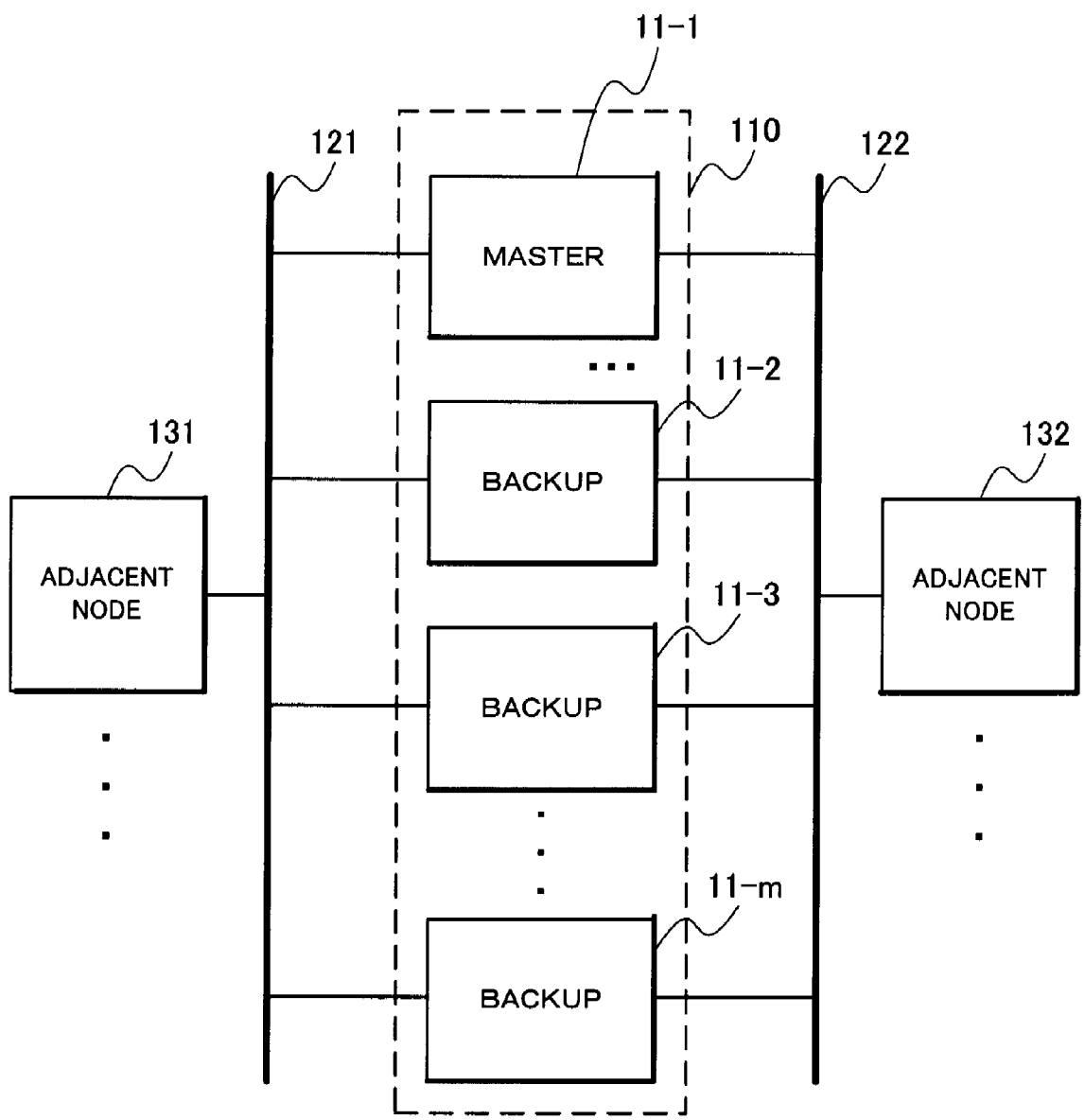
FIG. 1 is a block diagram for use in explaining a conventional redundant packet switching system.
Figure 2:
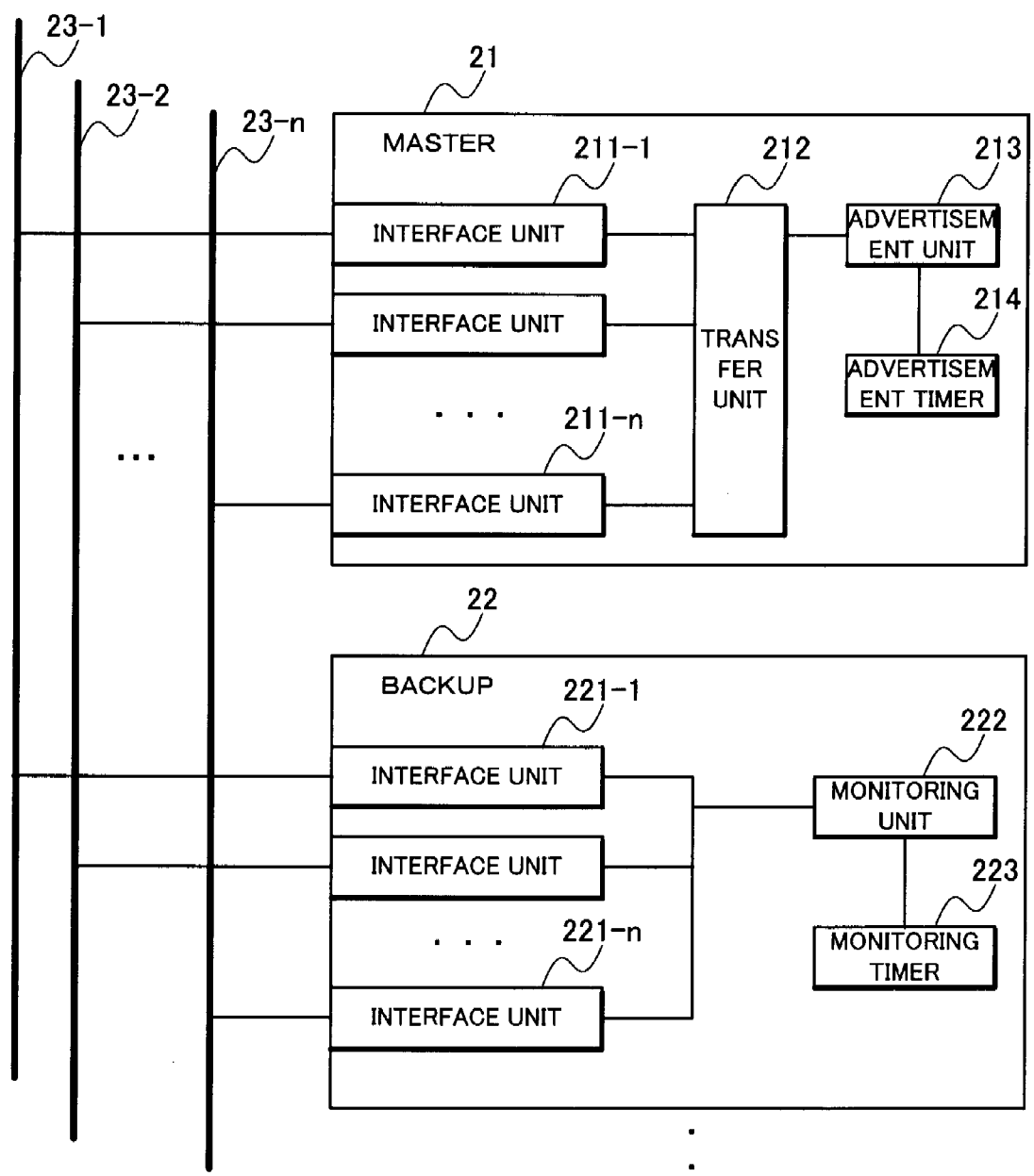
FIG. 2 is a block diagram for use in explaining a conventional packet switching device.
Figure 3:
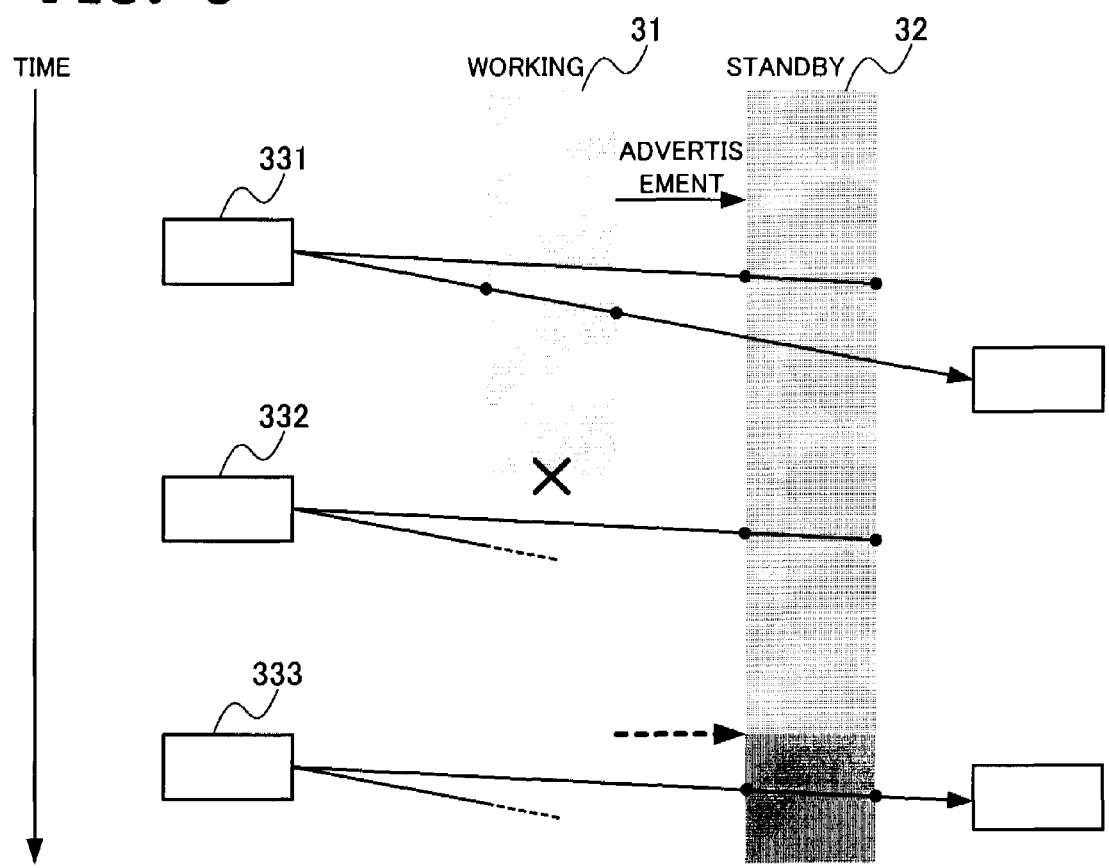
FIG. 3 is a time chart for use in explaining a problem of a conventional redundant packet switching system.
Figure 4:
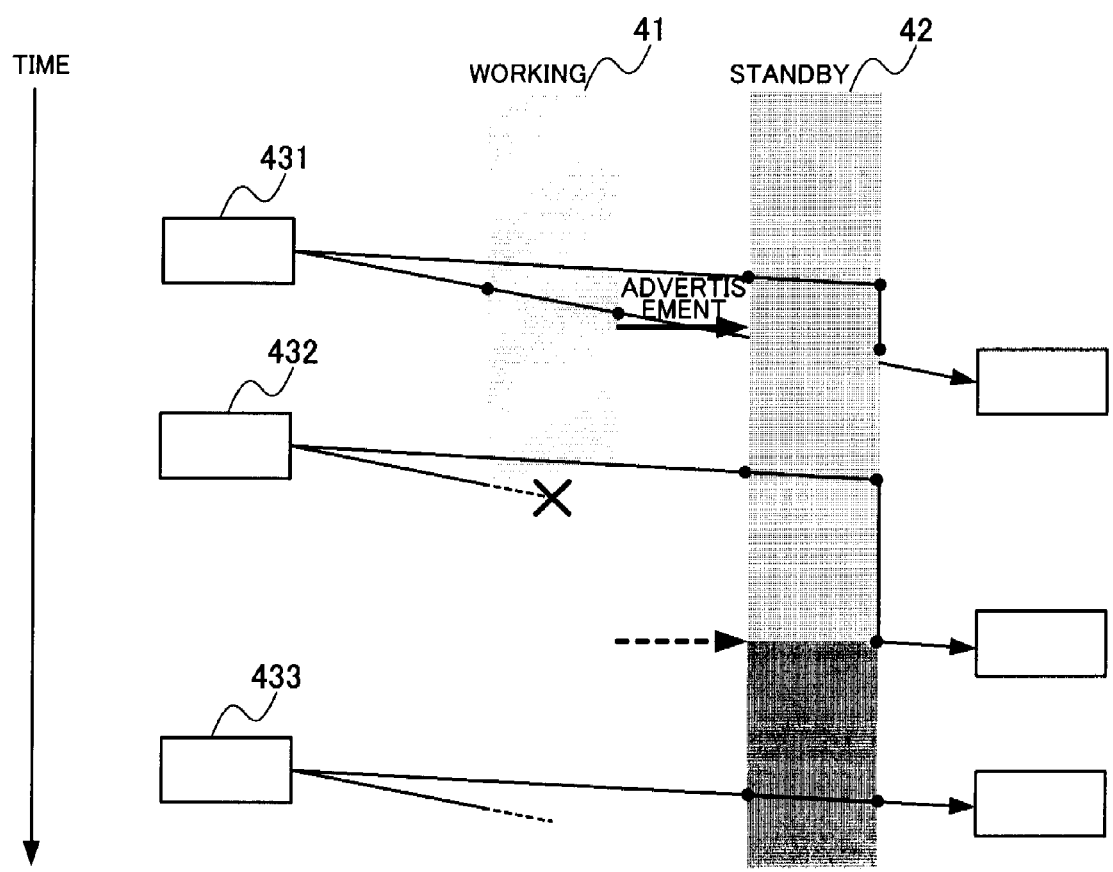
FIG. 4 is a time chart for use in explaining the effects of the present invention.
Figure 5:
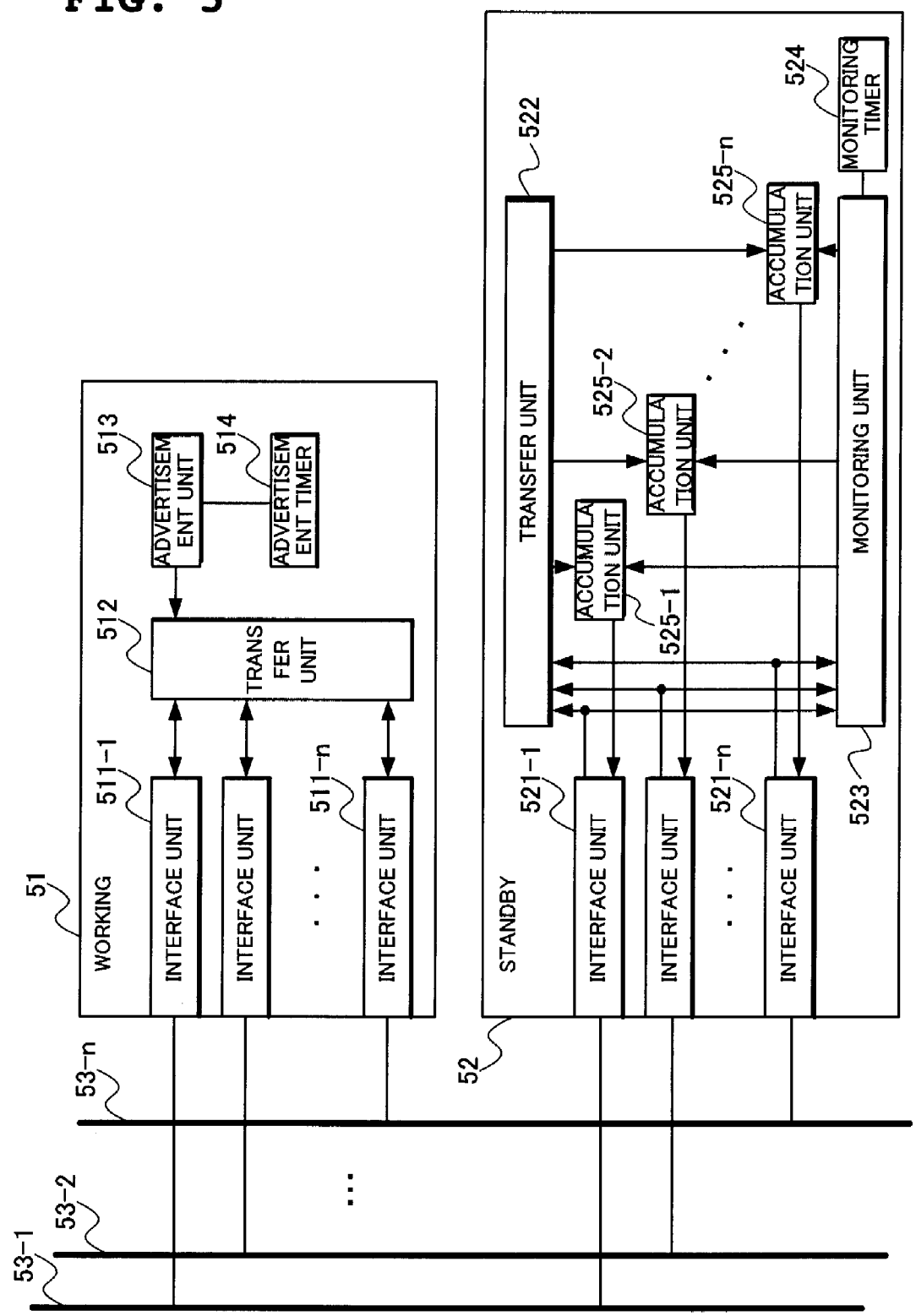
FIG. 5 is a block diagram of a first embodiment of the present invention.

With reference to FIG. 5, a redundant packet switching system according to a first embodiment of the present invention is formed of one packet switching device 51 of a working system (referred to as a working device) and one packet switching device 52 of a standby system (referred to as a standby device), with the working device 51 and the standby device 52 separately connected to multi-access data links 53-1~53-n. To the data links 53-1~53-n, adjacent nodes (not shown) are connected respectively.

The working device 51 includes a plurality of interface units 511-1~511-n one-to-one corresponding to the multi-access data links 53-1~53-n, a transfer unit 512, an advertisement unit 513 and an advertisement timer 514.

The interface units 511-1~511-n are used for frame transmission and reception to/from the corresponding multi-access data links 53-1~53-n. Packet in a frame arriving from any one of the interface units 511-1~511-n with its sender interface determined by the transfer unit 512 is transferred as a result of sending-out to the data link through the relevant one of the interface units 511-1~511-n. This enables the working device 51 to operate as a packet relay device.

To the interface units 511-1~511-n, in addition to a real data link address, a predetermined virtual data link address assigned to the redundant packet switching system is assigned. The interface units 511-1~511-n are set to receive a frame directed to the address. As the above predetermined data link address, in a case where a data link is an Ethernet®, a predetermined multicast Ethernet address is used.

The transfer unit 512 has a function of determining a subsequent hop and a sending-out interface by using destination information of a packet to be transferred which is applied from each of the interface units 511-1~511-n and route information held by the transfer unit 512 and handing over the packet to the relevant one of the sending-out interface units 511-1~511-n.

The advertisement unit 513 has a function of sending out an advertisement message of a predetermined format through the interface units 511-1~511-n to notify the standby unit 52 that the working device 51 is in operation.

For including in an advertisement message to be transmitted, the advertisement unit 513 includes an identifier of the redundant packet switching system to which the working device 51 belongs.

The advertisement unit 513 includes an advertisement timer 514. The advertisement timer 514 causes time-out at a predetermined advertisement transmission interval Advertisement_Interval. This arrangement allows the timer to have a function of notifying the advertisement unit 513 of advertisement transmission timing.

The standby device 52 includes interface units 521-1~521-n one-to-one corresponding to the multi-access data links 53-1~53-n, a transfer unit 522, a monitoring unit 523, a monitoring timer 524 and a plurality of accumulation units 525-1~525-n one-to-one corresponding to the interface units 521-1~521-n.

Although the interface units 521-1~521-n have the same function as that of the interface units 511-1~511-n of the working device 51, a packet to be sent to the multi-access data links 53-1~53-n is received from the accumulation units 525-1~525-n. Although the transfer unit 522 is the same in function as the transfer unit 512 of the working device 51, it transfers a packet to be sent out not to the interface units 521-1~521-n but to the accumulation units 525-1~525-n.

The plurality of the accumulation units 525-1~525-n each has a memory for accumulating a packet received from the transfer unit 522 and each is used for holding a packet to be transferred within the device until a predetermined time point (until subsequent confirmation of operation of the working device 51). In addition, the accumulation units 525-1~525-n each has a function of abandoning an accumulated packet according to an instruction from the monitoring unit 523 and a function of sending out an accumulated packet to the interface units 521-1~521-n in the order of accumulation, that is, on a first-in first-out basis.

The amount of packets which can be held in the accumulation units 525-1~525-n should be the amount larger than a product of a time-out time Master_Down_Interval of the monitoring timer 524 which will be described later and a maximum transfer bandwidth of the interface units 521-1~521-n corresponding to the accumulation units 525-1~525-n.

Assume, for example, that the time-out time of the monitoring timer 524 is 50 milliseconds, the accumulation units 525-1~525-n connected to the interface units 521-1~521-n having a 100 Mbps transmission band needs to have at least 5 Mbps packet holding capacity.

The monitoring unit 523 has a function of analyzing an advertisement message transmitted by the working device 51 which is received through the interface units 521-1~521-n and determining whether the working device 51 is active or inactive. The monitoring unit 523 includes the monitoring timer 524 for measuring an advertisement message reception interval.

The monitoring timer 524 times out at the predetermined time interval Master_Down_Interval. The monitoring unit 523 has a function of resetting the timer 524 to an initial value upon reception of an advertisement message. For monitoring activeness/inactiveness (monitoring an in-operation state and a stopped state) of the working device 51 by resetting the monitoring timer 524 upon periodical reception of an advertisement message to prevent time-out, the value Advertisement_Interval is set to be smaller than the value Master_Down_Interval.

The monitoring unit 523 also includes an identifier of the redundant packet switching system to which the device itself belongs for identifying and analyzing a received advertisement message.

The monitoring unit 523 has a function of instructing the accumulation units 525-1~525-n to abandon or send out an accumulated packet.

Upon sensing that the working device 51 is in operation by the monitoring of activeness/inactiveness of the working device 51, that is, upon receiving an advertisement message from the working device 51, the monitoring unit 523 instructs the accumulation units 525-1~525-n to abandon the accumulated packets.

Upon sensing that the working device 51 is not in operation by the monitoring of activeness/inactiveness of the working device 51, that is, when the monitoring timer 524 times out, the monitoring unit 523 instructs the accumulation units 525-1~525-n to send out the accumulated packets to the interface units 521-1~521-n.

First Operation of Embodiment

Next, operation of the redundant packet switching system according to the first embodiment will be detailed.
(User Packet Processing at Redundant Packet Switching System)

First, description will be made of processing of a packet sent from an adjacent node with the redundant packet switching system as a subsequent hop (which will be hereafter referred to as a user packet in some cases).

As to a packet with an address assigned to the redundant packet switching system as a subsequent hop, the adjacent node transmits the packet directed to a virtual data link address corresponding to the above address for the redundant packet switching system. The virtual data link address is set to be received by both the working and standby packet switching devices.

In a case, for example, where the multi-access data links 53-1~53-n are of Ethernet, the adjacent node sends a user packet as storage in a data link frame whose destination is a multicast address and to the data links 53-1~53-n. The frame is received by all the devices forming the redundant packet switching system, that is, the working device 51 and the standby device 52.
(Transfer Processing at Working Device)

Figure 6:
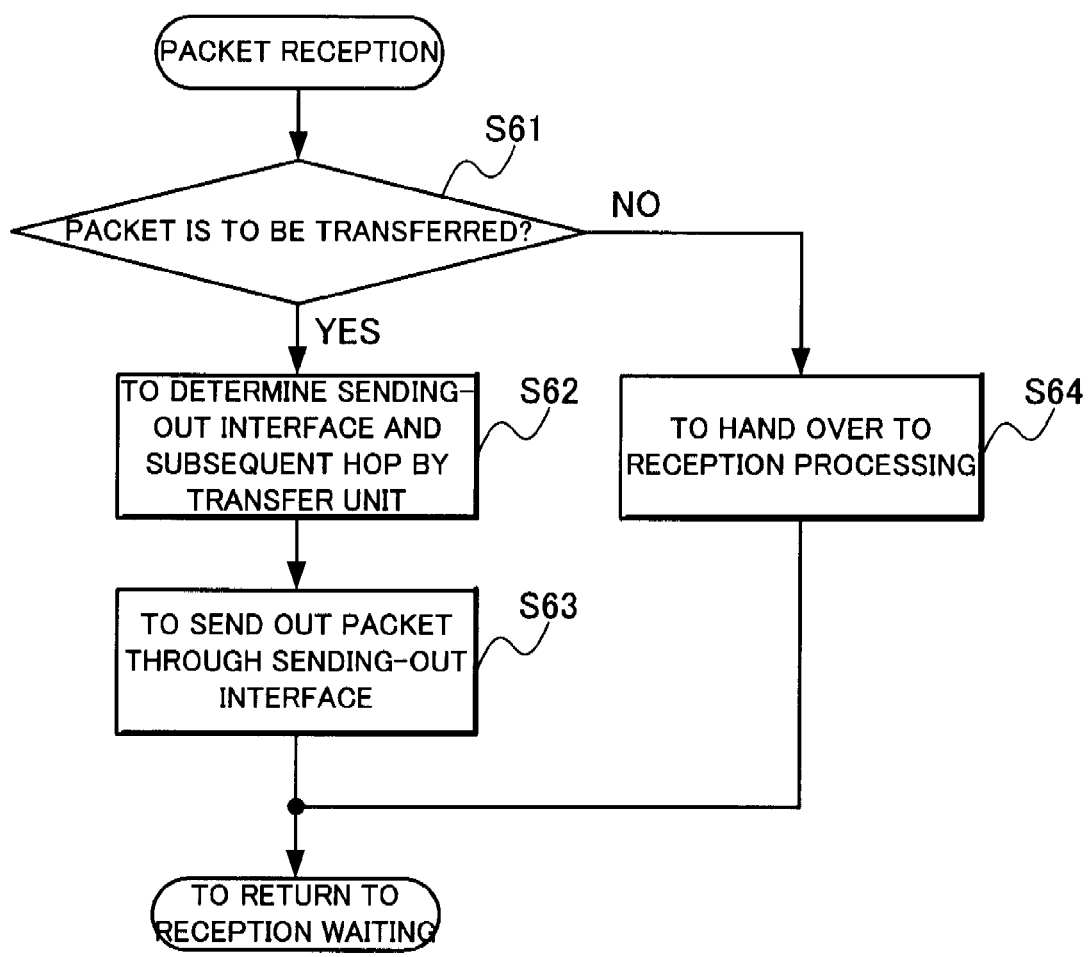
FIG. 6 is a flow chart showing one example of packet processing at a working device in the first embodiment of the present invention.

Next, operation of the working device 51 at the time of packet reception in the present embodiment will be described with reference to FIG. 6.

Packet received by the working device 51 is first discriminated as a packet to be transferred or other packet to branch the following processing at Step S61. Determination whether a packet is to be transferred or not is made based on the following:

a) whether a destination of a data link frame is a predetermined virtual data link address of a redundant packet switching system whose processing is being executed by the device itself, and b) whether other predetermined reception conditions are satisfied.

The predetermined reception condition in the above b) is, in a case of an IP network, that a destination address of the packet is equal to an address assigned to its own node and even a failure of satisfying the condition will not affect operation of the present embodiment.

Packet determined to be a target of transfer (Yes side) at Step S61 has its subsequent hop address and sending-out interface determined by the transfer unit 512 at Step S62.

When the sending-out interface is determined, the packet is transferred to the relevant one of the interface units 511-1~511-n as a packet for output and sent to the multi-access data links 53-1~53-n. Thus, the transfer processing at the working device 51 is executed.

Packet determined not to be a target of transfer (No side) at Step S61 will be handed over to other protocol reception processing at Step S64. As an example of such a packet is, for example, a packet based on a routing protocol.
(Accumulation Processing at Standby Device)

Figure 7:
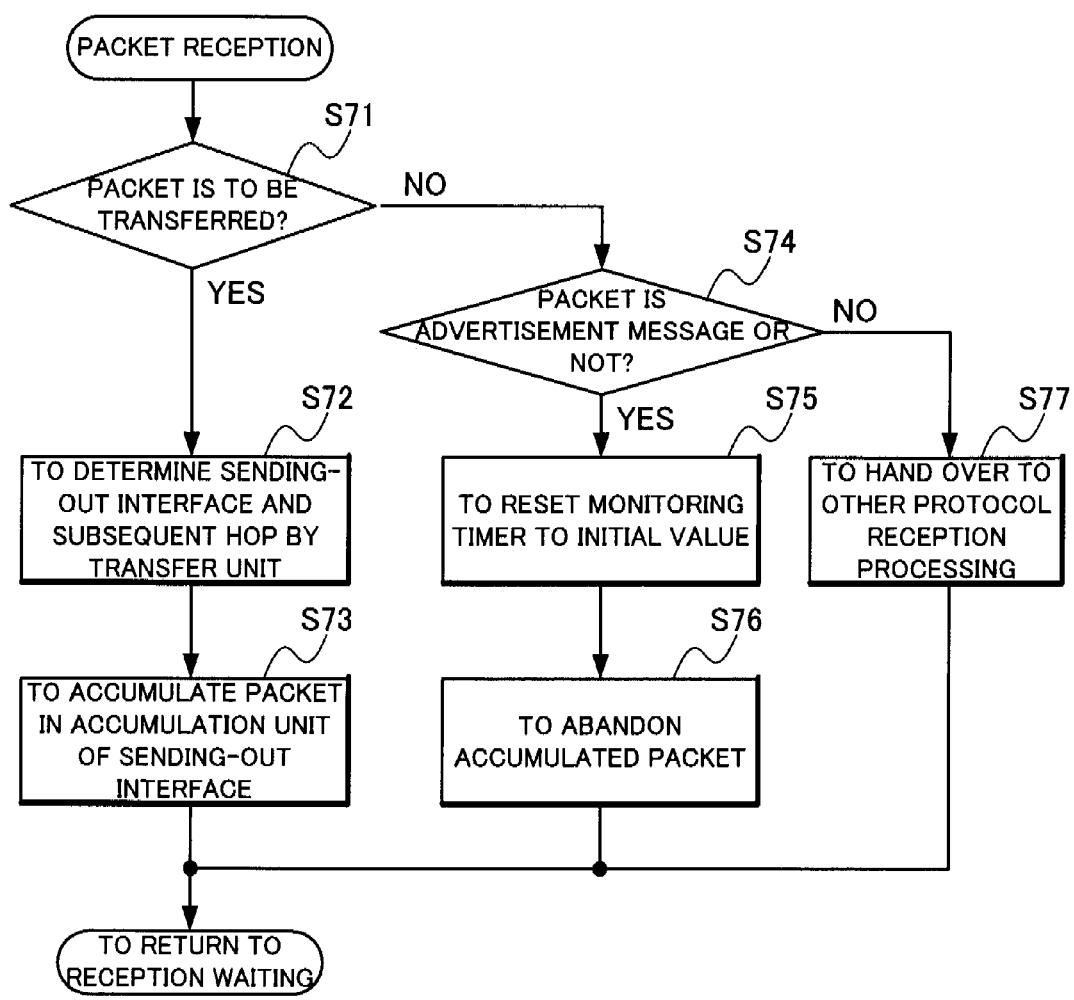
FIG. 7 is a flow chart showing one example of packet processing at a standby device in the first embodiment of the present invention.

Next, operation of the standby device 52 at the time of packet reception in the present embodiment will be described with reference to FIG. 7.

Packet received by the standby device 52 is first discriminated as a packet to be transferred or other packet to branch the following processing at Step S71. Branching procedure is that obtained by adding a condition to exclude an advertisement message from targets of transfer to the reception conditions in a case of the working device 51.

Packet determined to be a target of transfer (Yes side at Step S71) has its subsequent hop address and sending-out interface determined by the transfer unit 522 at Step S72.

When the sending-out interface is determined, the packet is accumulated in one of the accumulation units 525-1~525-n corresponding to relevant one of the interface units 521-1~521-n as a packet for output from the relevant one of the interface units 521-1~521-n at Step S73. Thus, the processing executed at the time of reception of a packet to be transferred ends.

At Step S74, the following processing branches based on whether a packet not to be transferred (No side at S71) is a predetermined advertisement message or a message not an advertisement. Determination whether it is an advertisement message or not is made by collating the contents of a header or a payload of the packet with predetermined conditions.

Packet determined to be an advertisement message (Yes side at Step S74) has its contained identifier of the redundant packet switching system examined and when it is the same as that held by the monitoring unit 523, the following processing will be continued. If the identifiers are different, the advertisement message will be abandoned.

At Step S75, in the advertisement reception processing, the monitoring timer 524 provided in the monitoring unit 523 is reset to an initial value upon reception of the advertisement message. At Step S76, all the accumulation units 525-1~525-n are instructed to abandon the accumulated packets. As a result, the monitoring timer 524 is reset at the reception of the advertisement message and the packets of the accumulation units 525-1~525-n are all abandoned.

Since the time-out time Master_Down_Interval of the monitoring timer is longer than the advertisement timer Advertisement_Interval of the working device 51, as long as the working device 51 continues transmission of an advertisement, the monitoring timer 524 never time out.

Packet determined not to be an advertisement message (No side at S74) will be handed over to other protocol reception processing at Step S77.

(Advertisement Message Transmission at Working Device)

Figure 8:
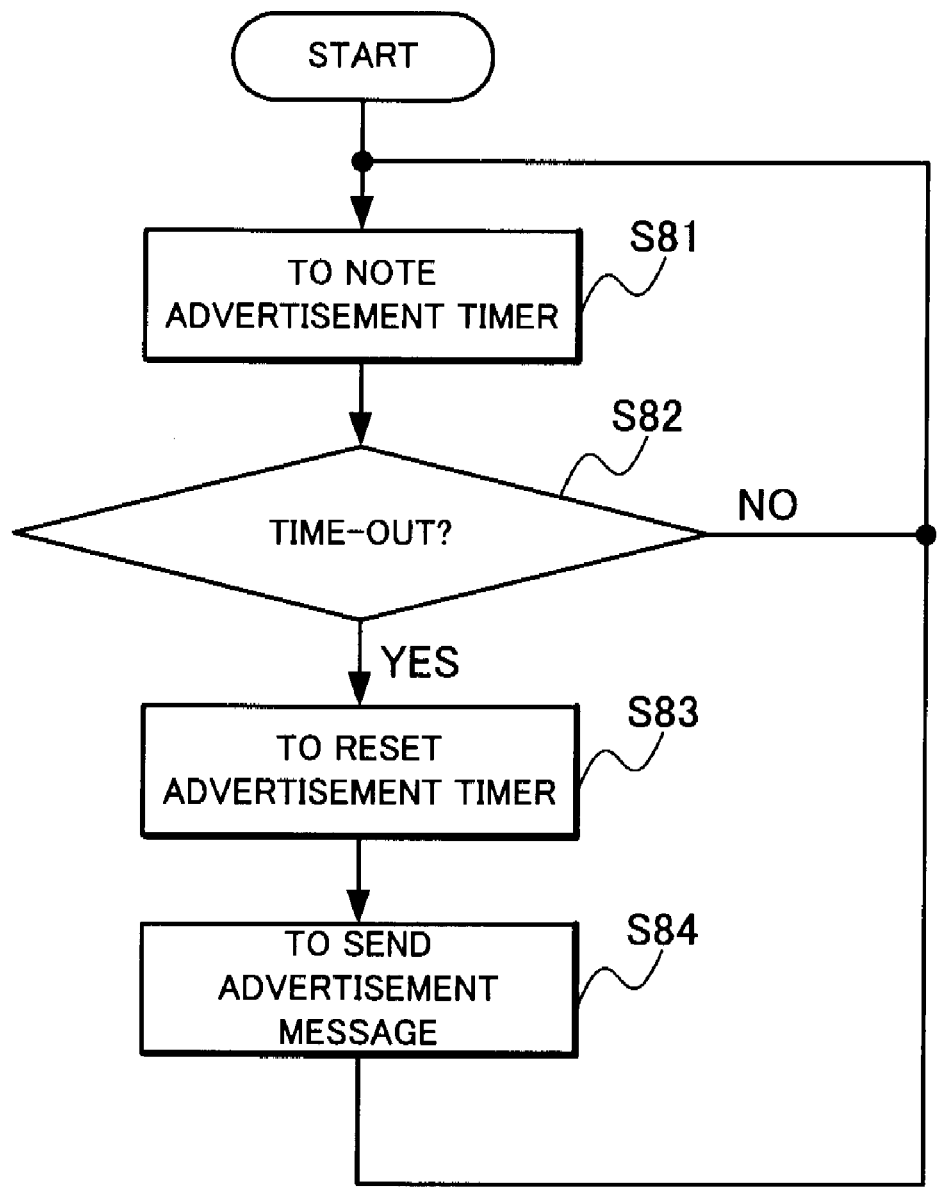
FIG. 8 is a flow chart showing one example of advertisement transmission processing at the working device in the first embodiment of the present invention.

Next, advertisement message transmission processing of the working device 51 in the present embodiment will be described with reference to FIG. 8.

The advertisement timer 514 provided in the working device 51 times out in a predetermined time Advertisement_Interval after resetting. In the advertisement transmission processing, time-out of the timer 514 is monitored at Step S81 and when time-out occurs at Step S82 (Yes side at S82), first the advertisement timer 514 is reset to an initial value at Step S83 and then, an advertisement message of a predetermined format is sent out to the multi-access data links 53-1~53-n. at Step S84.

The advertisement message is transmitted for indicating that the working device 51 is in operation and includes at least priority of its own device which is necessary for identifying the working device 51 and an identifier of the redundant packet switching system.

(Monitoring Processing at Standby Device)

Figure 9:
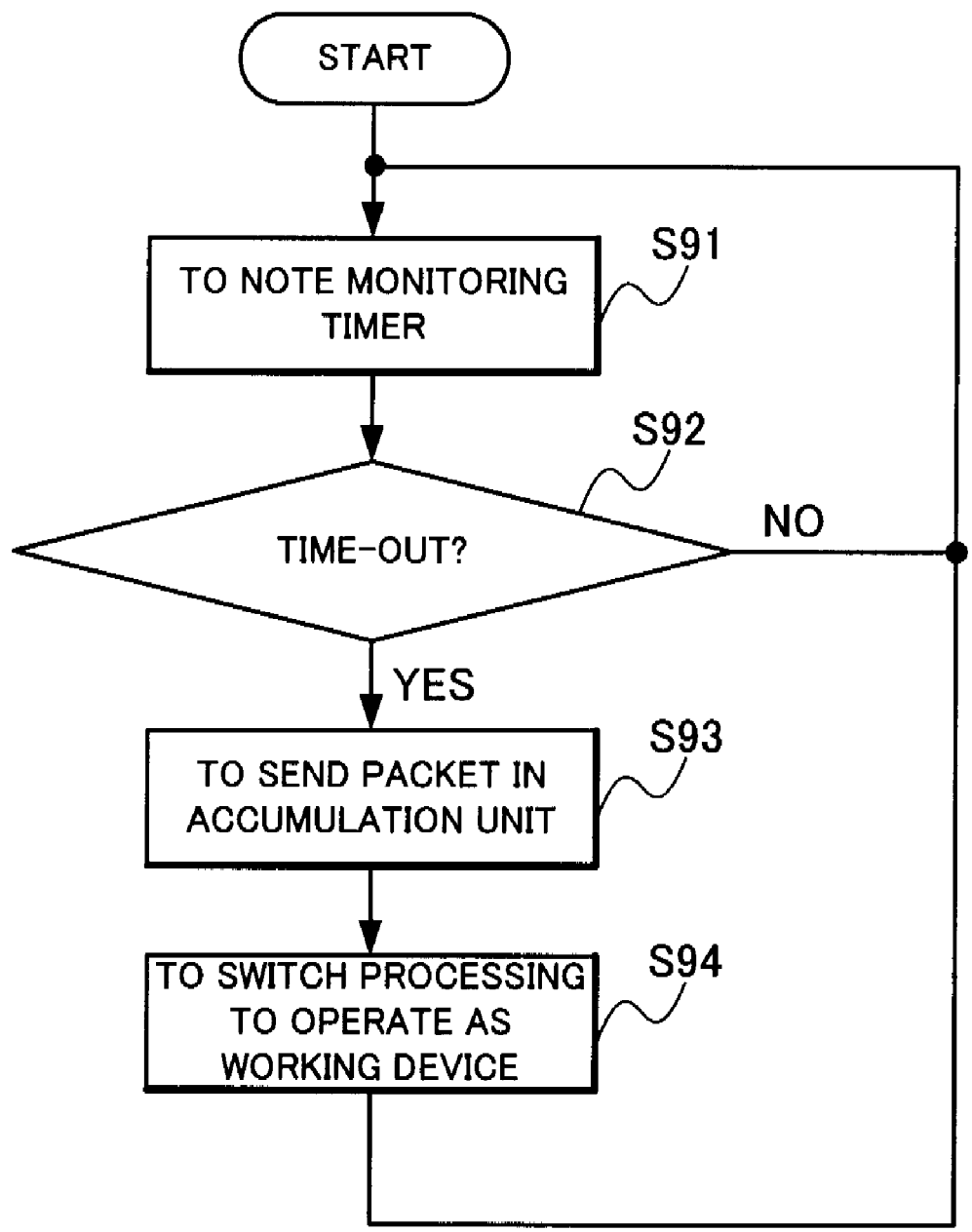
FIG. 9 is a flow chart showing one example of activeness/inactiveness monitoring processing at the standby device in the first embodiment of the present invention.

Next, description will be made of operation of monitoring activeness/inactiveness of the working device 51 and switching over to the working system which are executed by the monitoring unit 523 of the standby device 52 in the present embodiment with reference to FIG. 9.

The monitoring timer 524 provided in the standby device 52 times out in a predetermined time Master_Down_Interval after resetting. In the activeness/inactiveness monitoring processing, time-out of the timer 524 is monitored at Step S91 and when time-out occurs at Step S92 (Yes side at S92), determination is made that the working device 51 stops to execute subsequent processing.

First, at Step S93, user packets held in the accumulation units 525-1~525-n are sent out by the accumulation unit 525-i (1≦i≦n) through its corresponding interface unit 521-i. While the accumulation unit 525-i discharges the packets, the packets handed over from the transfer unit 522 to the accumulation unit 525-i are held by the accumulation unit 525-i until the discharging processing ends and sent out after the discharging processing.

The standby device 52 changes the processing procedure at Step 94 to behave as a working device thereafter. In other words, the device executes packet transfer and advertisement message transmission. In this case, when a packet to be sent to the multi-access data links 53-1~53-n immediately goes ready to be transmitted after accumulated in the accumulation units 525-1~525-n, it may be directly transmitted from the transfer unit 522 to the interface units 521-1~521-n without using the accumulation units 525-1~525-n.

Next, effects of the first embodiment will be described.

In the present embodiment, when an advertisement message from the working device 51 ceases and the monitoring timer 524 times out, all the packets accumulated in the accumulation units 525-1~525-n of the standby device 52 are sent out to the data links 53-1~53-n and thereafter the standby device 52 behaves as the working system, so that packet missing at the time of system switchover can be prevented. The reason is that after a time point of the last confirmation that the working device 51 is in operation (at a time point of preceding advertisement message reception) until detection of an operation stop of the working device 51 (equivalent to the time of Master_Down_Interval), all the packets as a target of transfer which are to be output from the working device 51 are contained in the accumulation units 525-1~525-n.

In addition, since packet missing at the time of system switchover can be prevented, performance of a higher layer protocol such as TCP can be avoided.

Second Embodiment

Next, a redundant packet switching system according to a second embodiment of the present invention will be described.

Figure 10:
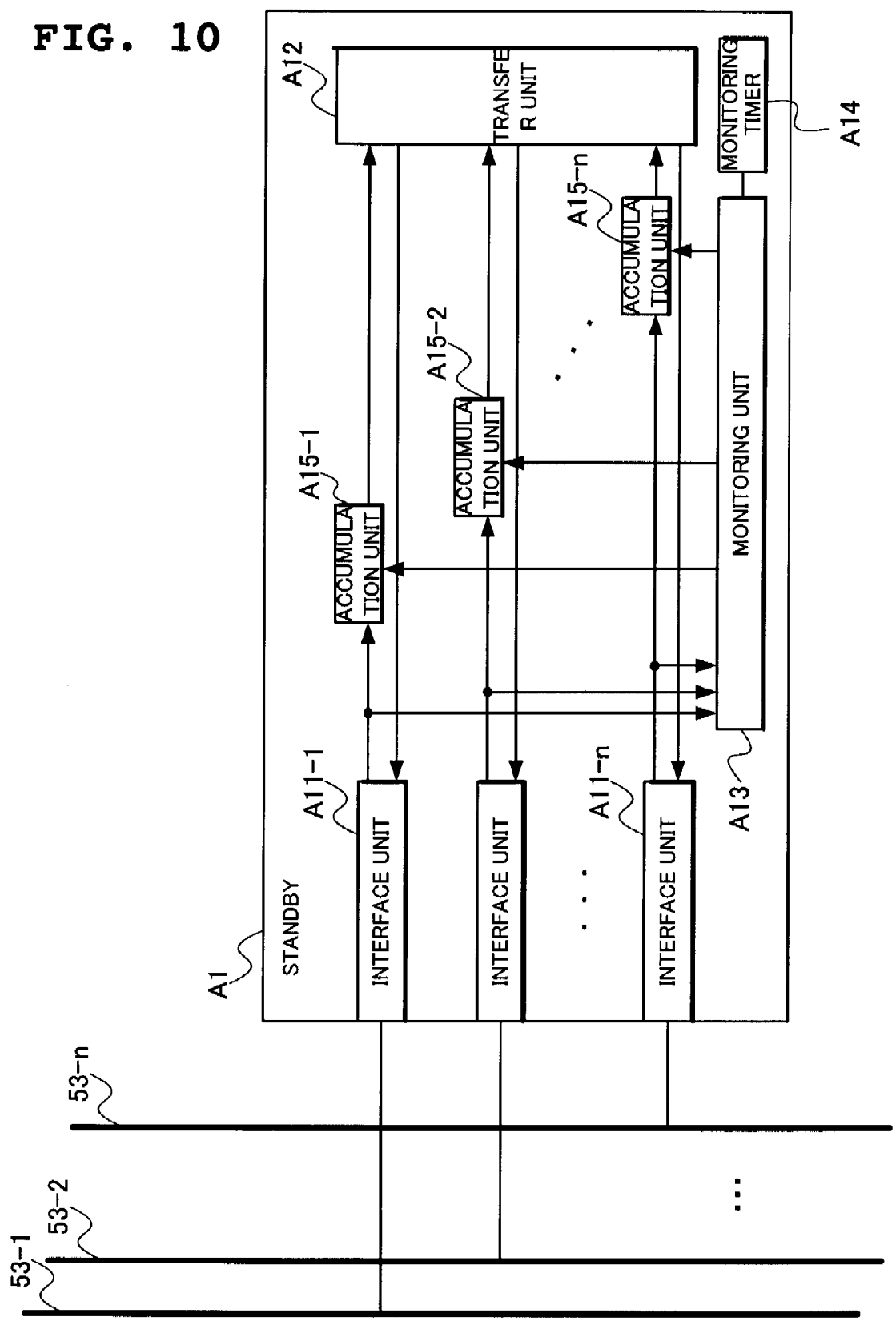
FIG. 10 is a block diagram of a second embodiment of the present invention.

With reference to FIG. 10, the redundant packet switching system according to the present embodiment differs from the redundant packet switching system according to the first embodiment shown in FIG. 5 in that a standby device A1 is provided as a packet switching device of a standby system.

Since a packet switching device of a working system of the redundant packet switching system according to the present embodiment is the same as the working device 51 shown in FIG. 5, no illustration is made thereof in FIG. 10.

In the present embodiment, the standby device A1 includes interface units A11-1~A11-n which transmit and receive a packet to/from the multi-access data links 53-1~53-n, accumulation units A15-1~A15-n which temporarily accumulate a packet received from the data links 53-1~53-n through the interface units A11-1~A11-n with a reception time added, a monitoring unit A13 which abandons a part of the packets accumulated in the accumulation units A15-1~A15-n at every reception of an advertisement message from the working device 51 through the interface units A11-1~A11-n and switches the standby device A1 to the working system when sensing that reception of an advertisement message ceases by time-out of a monitoring timer A14, and a transfer unit A12 which analyzes a packet accumulated in the accumulation units A15-1~A15-n when the standby device A1 switches to the working system and a packet newly received from the data links 53-1~53-n through the interface units A11-1~A11-n and outputs the same to the interface units A11-1~A11-n on a sending-out route.

The amount of packets which can be held by the accumulation units A15-1~A15-n is larger than that of the accumulation units 525-1~525-n in the standby device 52 of the first embodiment by the amount of time Δt required for transfer processing of the working device 51 and when a held packet is to be abandoned from the accumulation units A15-1~A15-n, those accumulated before the timeΔt which is required for transfer processing will be abandoned.

More specifically, abandon packets whose reception time point is before time T-Δt which is obtained by going back from a reception time T of the advertisement message by the timeΔt required for the transfer unit 512 of the working device 51 to transfer one packet. This is because when the working device 51 stops, a packet staying in the transfer unit 512 of the working device 51 will not be sent out from the working device 51 on the earliest occasion, so that it is necessary to accumulate packets in the standby device A1 and send out the same in place. The above timeΔt is defined by the system in advance and set at the monitoring unit A13.

Next, operation of the present embodiment will be described mainly with respect to differences from the first embodiment.

When packets are received at the standby device A1 and a packet to be transferred is selected, the relevant packet is accumulated in the accumulation units A15-1~A15-n before transmission to the transfer unit A12. As long as the monitoring unit A13 continues receiving an advertisement message from the working device 51, the monitoring unit A13 continues abandoning a packet in the accumulation units A15-1~A15-n, so that no packet will be handed over to the transfer unit A12.

When the working device 51 stops to cause the monitoring timer A14 to time out, since packets received from a time point when the working device 51 stops until when the standby device A1 senses the stop are held in the accumulation units A15-1~A15-n, the monitoring unit A13 causes the standby device A1 to switch from the standby system to the working system, the accumulation units A15-1~A15-n to discharge the held packets and the transfer unit A12 having received the packets to execute transfer processing, thereby sending out the packets through the interface units A11-1~A11-n on the sending-out side. In addition, while the accumulation units A15-1~15-n discharge the packets, a packet newly received at the interface units A11-1~A11-n from the multi-access data links 53-1~53-n are held at the accumulation units A15-1~A15-n until the discharging processing ends and sent out after the discharging processing. In this case, when a packet enters a passing state without being accumulated in the accumulation units A15-1~A15-n, packets may be directly transmitted from the interface units A11-1~A11-n to the transfer unit A12 without using the accumulation units A15-1~A15-n.

Next, effects of the second embodiment will be described.

In the present embodiment, when an advertisement message from the working device 51 ceases to cause the monitoring timer A14 to time out, all the packets accumulated in the accumulation units A15-1~A15-n of the standby device A1 are sent out to the transfer unit A12 and thereafter the standby device A1 behaves as a working device, so that packet missing at the time of system switchover can be prevented. The reason is that in the accumulation units A15-1~A15-n, all the packets received from when the working device 51 stops until when the standby device A1 senses the stop are held.

In addition, because packet missing at the time of system switchover can be prevented, deterioration of performance of a higher layer protocol such as TCP can be avoided.

Further effect is that because no processing of the transfer unit A12 is executed while the standby device A1 operates as the standby system, the amount of computation can be reduced to be smaller than that of the first embodiment. Time, however, required for the standby device A1 to start sending out a packet after the working device 51 stops will be longer than that of the first embodiment because transfer processing of packets held in the accumulation units A15-1~A15-n is executed after detection of the stop of the working system.

Third Embodiment

Next, a redundant packet switching system according to a third embodiment of the present invention will be described.

In the first and second embodiments, packets sent out by the standby devices 52 and A1 are accumulated in the accumulation units 525-1~525-n and A15-1~A15-n during a time required for sensing a stop. During a period from the last transmission of an advertisement message by the working device 51 until the stop of packet sending due to operation stop, packets are being sent from the working device 51, while the standby devices 52 and A1 accumulate packets. Therefore, when the standby devices 52 and A1 discharge their held packets after sensing of the stop, a part of them might overlaps with packets sent by the working device 51.

Since in the TCP protocol, the reception side simply abandons an incoming overlapping packet, the problem in terms of the protocol is less serious than that of packet missing. When the volume of traffic in the network increases, however, there occurs a problem that at the switchover of the standby system to the working system, relay of non-overlapping packets delays as much as a discharging time of overlapping packets and therefore, it is preferable to have less packet overlap.

In the redundant packet switching system according to the present embodiment, a standby device monitors a packet sent by a working device to eliminate the same packet from an accumulation unit, thereby preventing a packet discharged by the standby device from overlapping with a packet sent out by the working device.

Figure 11:
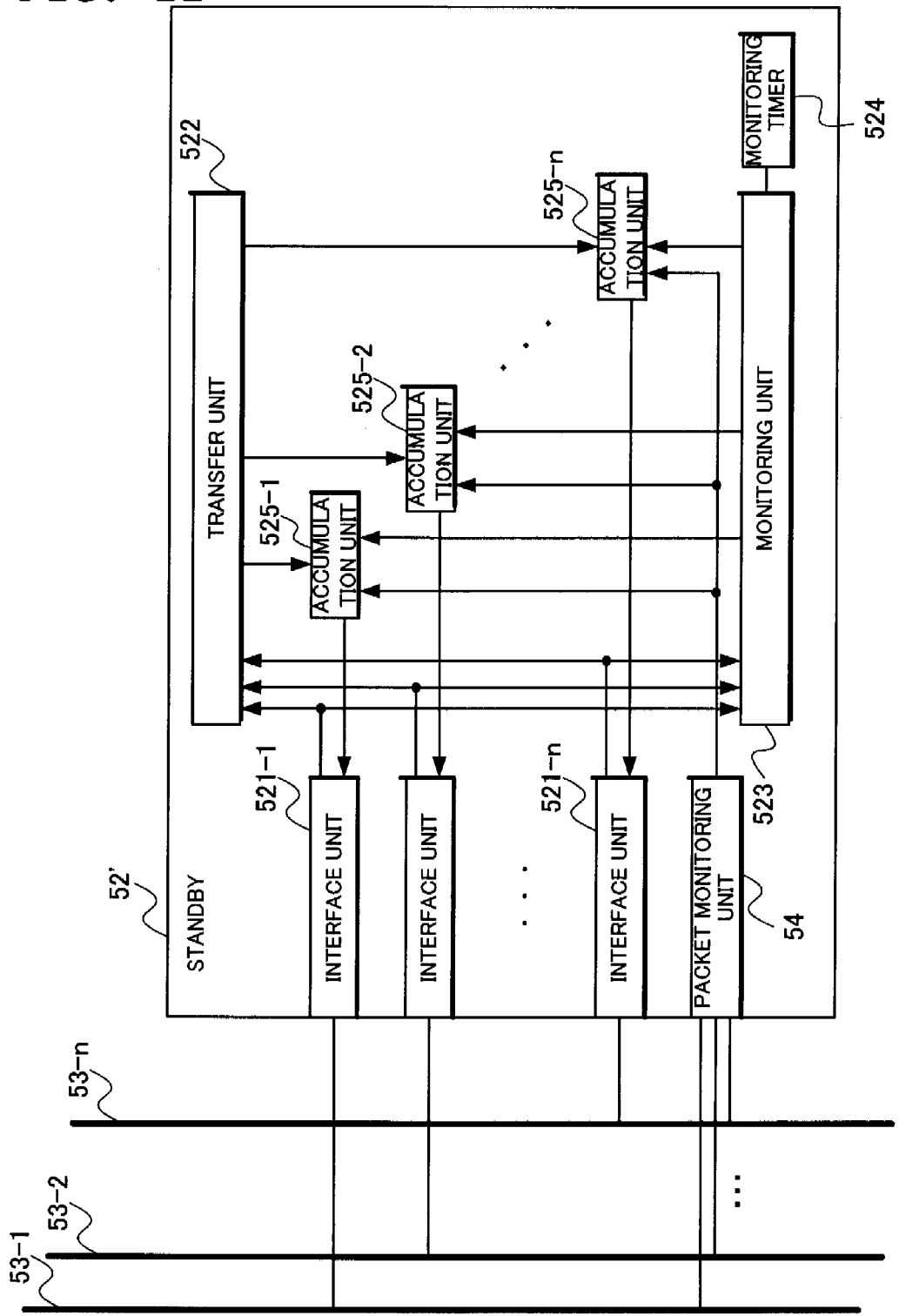
FIG. 11 is a block diagram of a third embodiment of the present invention.

With reference to FIG. 11, the redundant packet switching system according to the present embodiment differs from the redundant packet switching system according to the first embodiment shown in FIG. 5 in having a standby device 52' as a standby system packet switching device. A working system packet switching device of the redundant packet switching system according to the present embodiment is the same as that of the working device 51 shown in FIG. 5 and its illustration is omitted in FIG. 11.

The standby device 52' includes a packet monitoring unit 54 in addition to the components provided in the standby device 52 shown in FIG. 5. The packet monitoring unit 54 is connected to the multi-access data links 53-1~53-n and has the function of monitoring a frame sent by the working device 51 to the multi-access data links 53-1~53-n and deleting the same packet as a packet to be transferred which is stored in the frame from the accumulation units 525-1~525-n. The packet monitoring unit 54 holds a real data link address (MAC address etc.) assigned to the interface units 511-1~511-n of the working device 51 and senses a frame with the held real data link address as a transmission source address. The packet monitoring unit 54 may be connected to the multi-access data links 53-1~53-n through the interface units 521-1~521-n.

Next, operation of the present embodiment will be described mainly with respect to a difference from the first embodiment.

Figure 12:
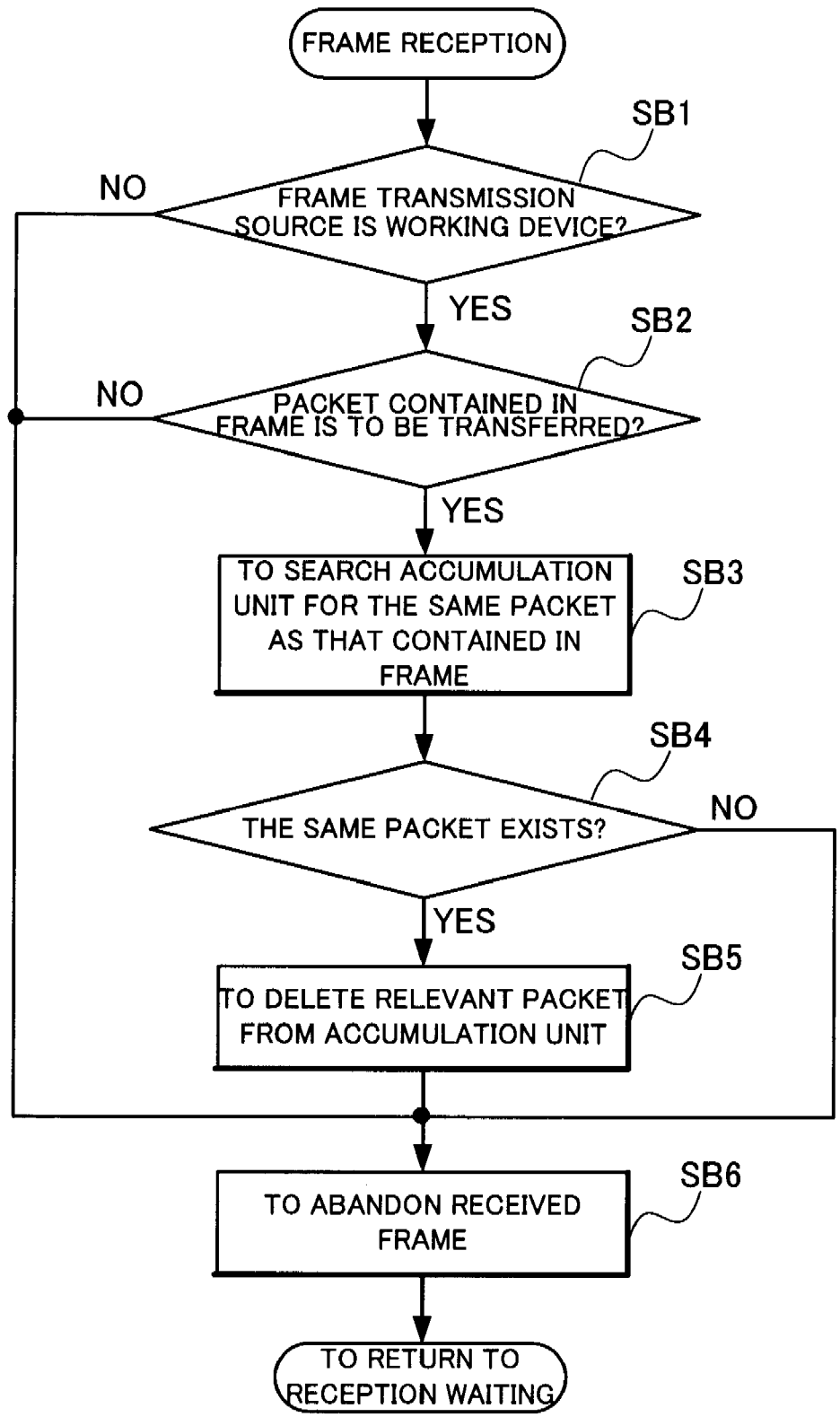
FIG. 12 is a flow chart showing one example of packet monitoring processing at a standby device in the third embodiment of the present invention.

FIG. 12 is a flow chart showing operation of the packet monitoring unit 54 of the standby device 52' in the present embodiment. Upon receiving a frame from any of the data links 53-1~53-n, the packet monitoring unit 54 of the standby device 52' examines the received frame at Step SB1 and when a transmission source data link address is equal to the address of the working device 51 (Yes at SB1), further examines whether a packet contained in the frame is a target of transfer at Step SB2. Determination whether the packet is a target of transfer or not is the same as the processing at Step S71 as the accumulation processing of the standby device 52 in the first embodiment. When the transmission source data link address of the received frame fails to coincide with the address of the working device 51 (No at SB1) or when the packet contained in the frame is not a target of transfer (No at SB2), proceed to Step SB6.

Since a packet which is transmitted by the working device 51 and is a target of transfer (Yes side at SB2) indicates that the working device 51 has already made transfer thereof, accumulation is unnecessary. Therefore, search the accumulation units 525-1~525-n for the packet at Step SB3. When the received frame comes from the data link 53-i, it is necessary to search only the accumulation unit 525-i corresponding to the data link 53-i. When determination on a search result is made at Step SB4 to find a relevant packet (Yes side), delete the relevant packet from the accumulation unit at Step SB5. Unless found (No side), proceed to Step SB6.

At Step SB6, abandon the received frame to return to reception waiting.

The remaining operation is the same as that of the first embodiment.

Next, effects of the third embodiment will be described.

According to the present embodiment, in addition to the same effect as that of the first embodiment, it is possible to obtain the effect of preventing sending of the same packet as a packet already sent out by the working device from the standby device to the data link at the time of system switchover caused by an operation stop of the working device. The reason is that the packet monitoring unit 54 monitors a frame sent out to the multi-access data links 53-1~53-n and when sensing the same packet as a packet to be transferred which is stored in a frame transmitted by the working device 51, deletes the packet from the accumulation units 525-1~525-n.

In addition, according to the present embodiment, a delay time in packet relay at the time of system switchover can be improved more than that according to the first embodiment. The reason is that because packets are deleted to prevent an overlapping packet from remaining in the accumulation units 525-1~525-n, relay of non-overlapping packets can be started immediately when the standby system switches to the working system.

In the present embodiment, however, because packets sent by the working device 51 should be all examined by the standby device 52' and searching processing of accumulated packets is also required, the amount of processing by the standby device will be larger than that in the first embodiment.

Although the present embodiment is premised on the first embodiment, it can be premised on the second embodiment. In the following, an example premised on the second embodiment will be described as a modification example of the third embodiment.

Figure 13:
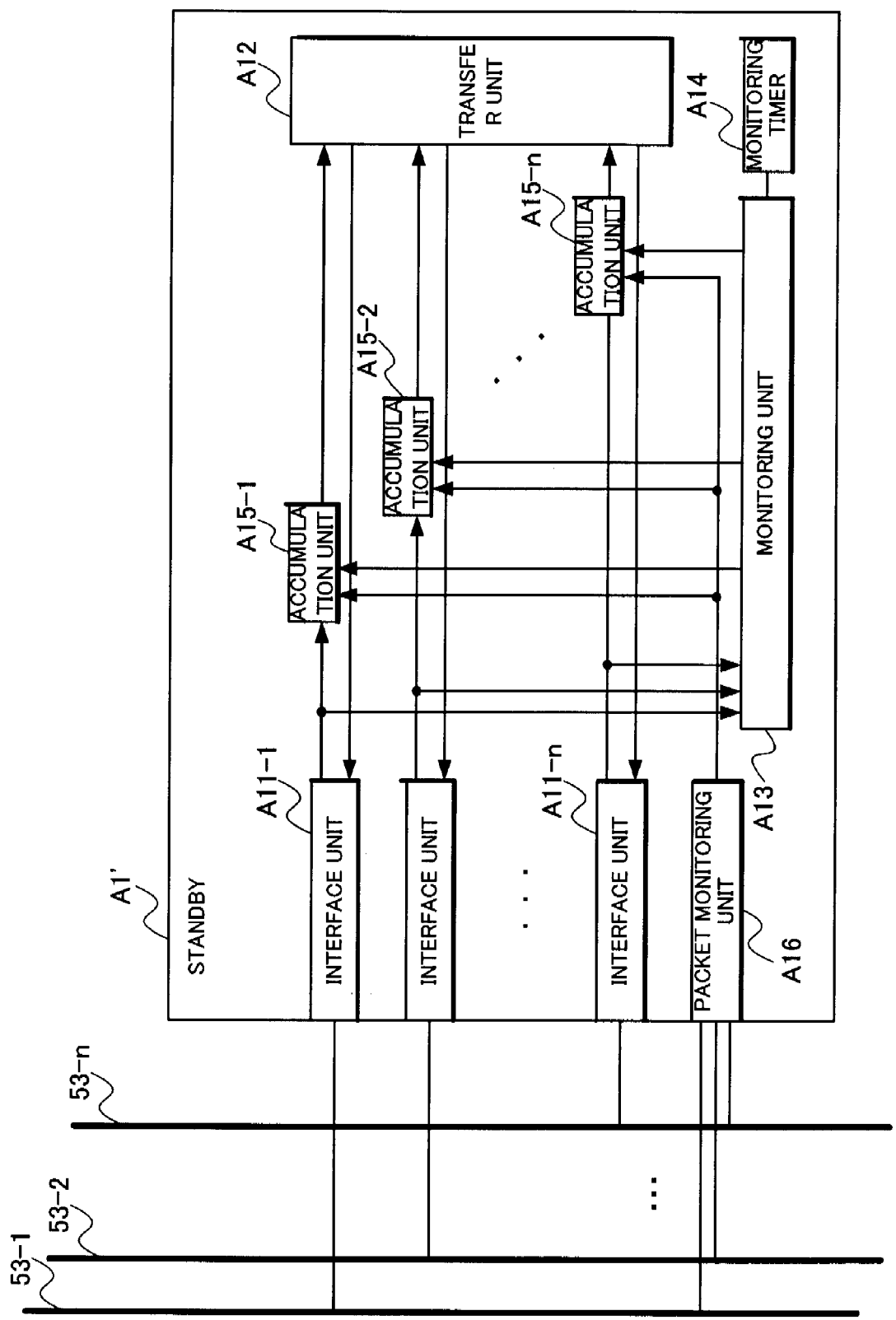
FIG. 13 is a block diagram of a modification example of the third embodiment of the present invention.

With reference to FIG. 13, a redundant packet switching system according to a modification example of the third embodiment differs from the redundant packet switching system according to the second embodiment shown in FIG. 10 in having a standby device A1' as a standby system packet switching device. Similarly to the second embodiment, a working system packet switching device of the redundant packet switching system according to the present embodiment is the same as the working device 51 shown in FIG. 5 and its illustration is omitted in FIG. 12.

The standby device A1' further includes a packet monitoring unit A16 in addition to the components provided in the standby device A1 shown in FIG. 10. The packet monitoring unit A16 is connected to the multi-access data links 53-1~53-n and has the function of monitoring a frame sent by the working device 51 to the multi-access data links 53-1~53-n and deleting the same packet as a packet to be transferred which is stored in the frame from the accumulation units A15-1~A15-n. The packet monitoring unit A16 holds a real data link address (MAC address etc.) assigned to the interface units 511-1~511-n of the working device 51 and senses a frame with the held real data link address as a transmission source address. The packet monitoring unit A16 may be connected to the multi-access data links 53-1~53-n through the interface units A11-1~A11-n.

Next, operation of the present modification example will be described mainly with respect to a difference from the second embodiment.

Operation of the packet monitoring unit A16 of the standby device A1' in the present modification example will be described with reference to FIG. 12. Upon receiving a frame from any of the data links 53-1~53-n, the packet monitoring unit A16 of the standby device A1' examines the received frame at Step SB1 and when a transmission source data link address is equal to the address of the working device 51 (Yes at SB1), further examines whether a packet contained in the frame is a target of transfer at Step SB2. Determination whether the packet is a target of transfer or not is the same as the processing at Step S71 of the accumulation processing of the standby device 52 in the first embodiment. When the transmission source data link address of the received frame fails to coincide with the address of the working device 51 (No at SB1) or when the packet contained in the frame is not a target of transfer (No at SB2), proceed to Step SB6.

Since a packet which is transmitted by the working device 51 and is a target of transfer (Yes side at SB2) indicates that the working device 51 has already made transfer thereof, accumulation is unnecessary. Therefore, search the accumulation units 525-1~525-n for the packet at Step SB3. In a case of this modification example, all the accumulation units A15-1~A15-n should be searched. When determination on a search result is made at Step SB4 to find a relevant packet (Yes side), delete the relevant packet from the accumulation unit at Step SB5. Unless found (No side), proceed to Step SB6.

At Step SB6, abandon the received frame to return to reception waiting.

The remaining operation is the same as that of the second embodiment.

Next, effects of the present modification example will be described.

According to the present modification example, in addition to the same effect as that of the second embodiment, it is possible to obtain the effect of preventing sending of the same packet as a packet already sent out by the working device from the standby device to the data link at the time of system switchover caused by an operation stop of the working device. The reason is that the packet monitoring unit A16 monitors a frame sent out to the multi-access data links 53-1~53-n and when sensing the same packet as a packet to be transferred which is stored in a frame transmitted by the working device 51, deletes the packet from the accumulation units A15-1~A15-n.

In addition, according to the present modification example, a delay time in packet relay at the time of system switchover can be more improved than in the second embodiment. The reason is that because packets are deleted to prevent an overlapping packet from remaining in the accumulation units A15-1~A15-n, relay of non-overlapping packets can be started immediately when the standby system switches to the working system.

In the present modification example, however, because the packets sent by the working device 51 should be all examined by the standby device A1' and searching processing of accumulated packets is also required, the amount of processing by the standby device will be larger than that in the second embodiment.

Fourth Embodiment

Next, a redundant packet switching system according to a fourth embodiment of the present invention will be described.

In the first to third embodiments (including the modification example of the third embodiment, which will be the same hereinafter), to one working device, only one standby device is provided. When the working device stops, although a device initially operating as a standby device switches to operate as a working device as a substitute, there will exist no standby device after the switchover, so that redundancy will be lost. For coping with this problem, a plurality of standby devices are provided to increase redundancy in the present embodiment.

With a plurality of standby devices recited in the first to third embodiments provided, however, these standby devices simultaneously send out accumulated packets when the working device stops, which results in overlap-sending of packets. In the present embodiment, therefore, overlap-sending is prevented by providing one standby device which accumulates packets with priority set and itself behaves as a working device when the working device stops. In the present specification, among the plurality of standby devices, a standby device which itself behaves as a working device when the working device stops is referred to as a head standby device.

For determining a head standby device, information is exchanged between the standby devices in the present embodiment. For this purpose, the standby device is additionally provided with an advertisement message transmission function. Once a head standby device is determined, other standby devices than the head standby device thereafter stops transmission of an advertisement message in order to reduce the amount of communication and processing loads.

Figure 14:
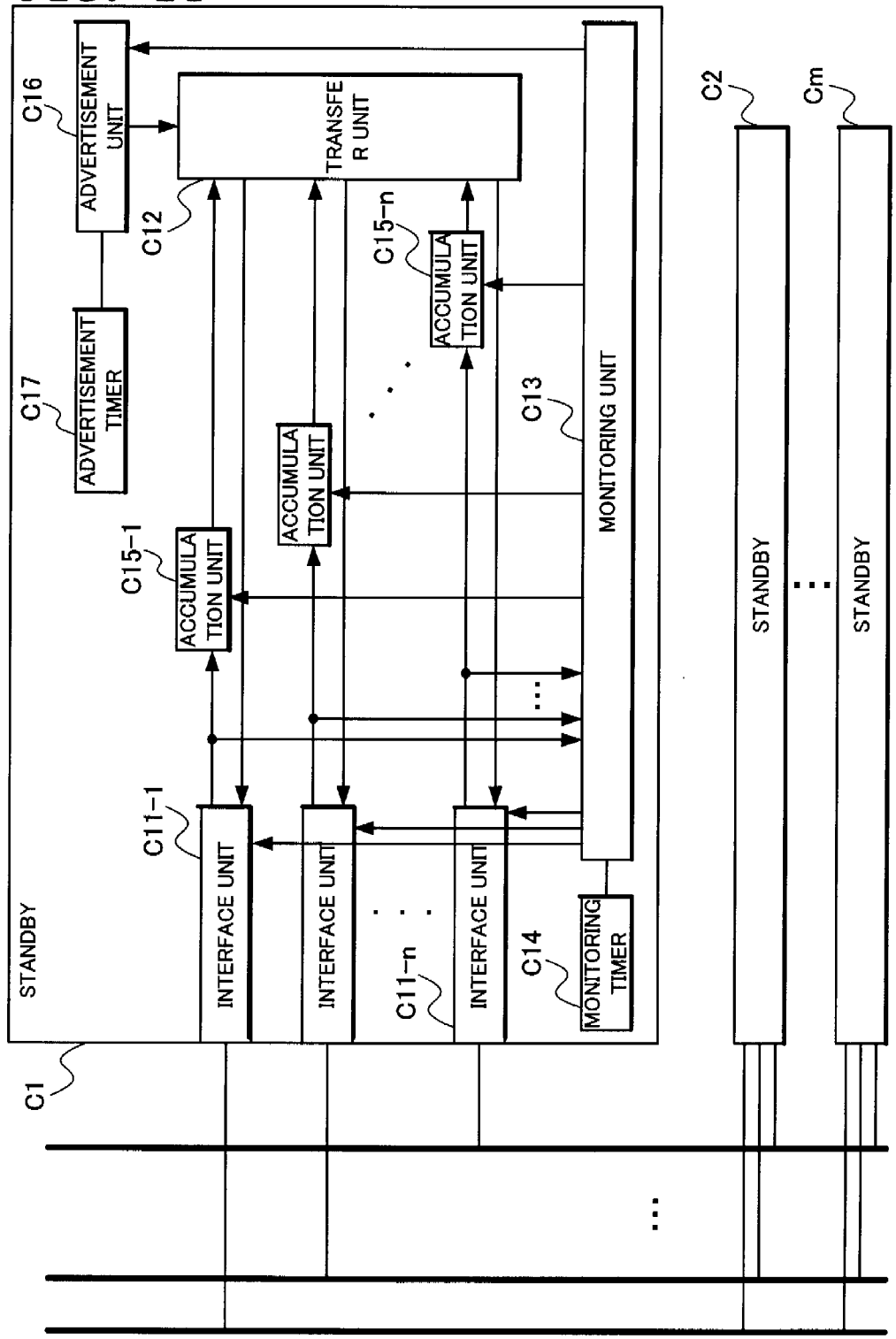
FIG. 14 is a block diagram of a fourth embodiment of the present invention.

With reference to FIG. 14, the redundant packet switching system according to the present embodiment differs from the redundant packet switching system according to the first embodiment shown in FIG. 5 in having a plurality of standby devices C1, C2, . . . , Cm as standby system packet switching devices. A working system redundant packet switching device of the redundant packet switching system according to the present embodiment is the same as the working device 51 shown in FIG. 5 and its illustration is omitted in FIG. 14.

As shown in the block of the standby device C1, in the present embodiment, the standby device C1 includes an advertisement unit C16 and an advertisement timer C17, with the advertisement unit C16 holding a flag indicative of being in operation as a standby device and priority information of each of the devices C1~Cm in the redundant packet switching system and having a function of including the flag indicative of being a standby device and priority in an advertisement message and the advertisement timer C17 having a function of controlling operation•stop. Priority of each of the devices C1~Cm is set to be ordered in advance.

Interface units C11-1~C11-n additionally have a function of receiving only an advertisement message and abandoning other packet, a monitoring unit C13 has a function of controlling the interface units C11-1~C11-n to receive only an advertisement message as a packet to be received or receive a packet without limitation similarly to the interface units 521-1~521-n in the first embodiment and a function of controlling operation•stop of the advertisement timer C17, and further provided individually are a monitoring timer C14 and a function (not shown) of recording information contained in an advertisement message for working and head standby devices.

The other standby devices C2~Cm have the same structure as that of the standby device C1.

Figure 15:
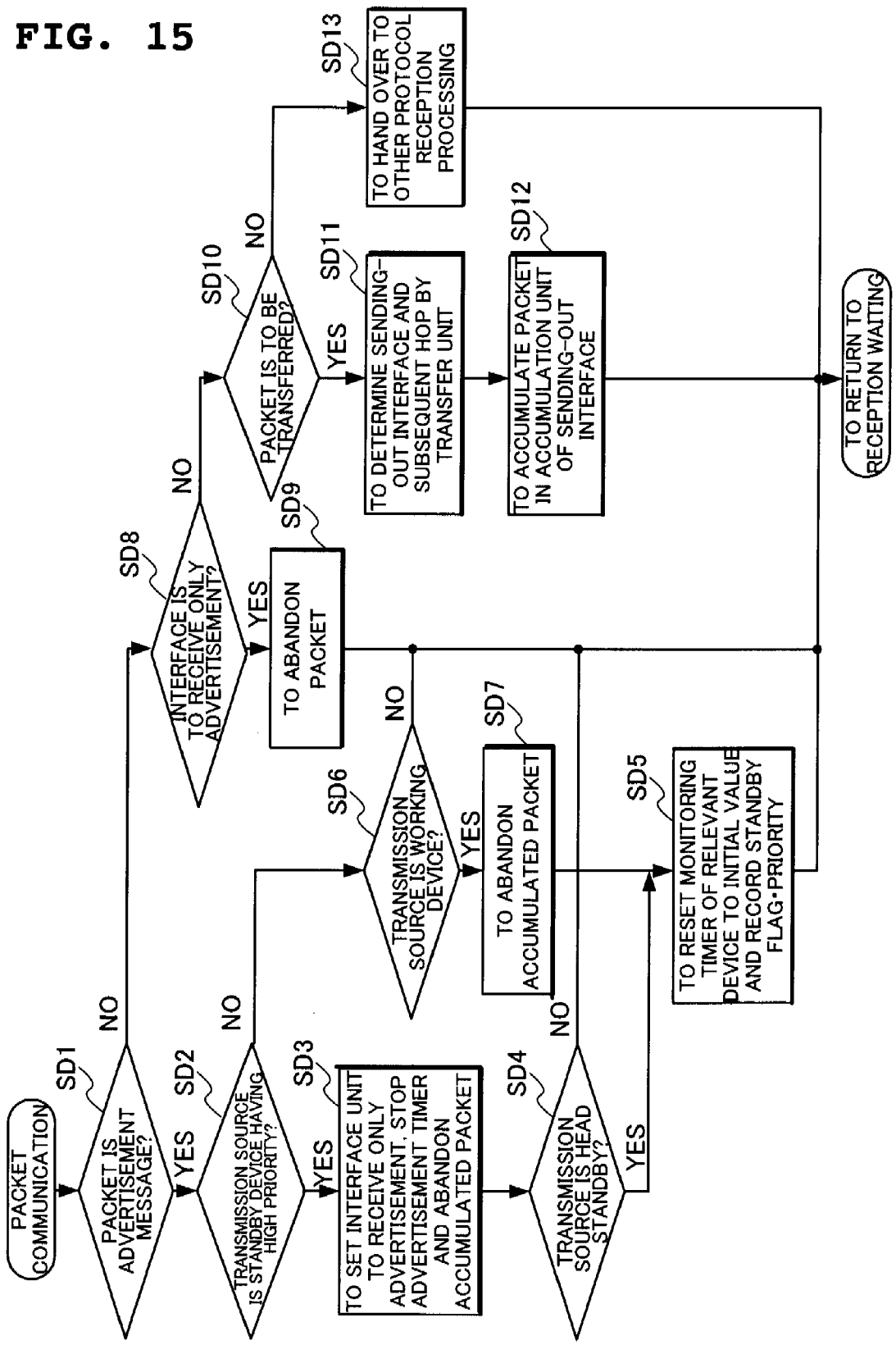
FIG. 15 is a flow chart showing one example of packet processing at a standby device in the fourth embodiment of the present invention.

FIG. 15 is a flow chart showing operation of packet reception by the standby devices C1~Cm in the present embodiment. Upon receiving a packet, determine whether it is an advertisement message or not at Step SD1. If it is an advertisement message, first compare priority of the advertisement message and its own priority at Step SD2.

If a transmission source of the advertisement message is a standby device having priority higher than its own, the device itself is not a head standby device. Accordingly, at Step SD3, the device itself stops packet accumulation and transmission of an advertisement message. Therefore, set the interface units C11-1~C11-n to a mode of receiving only an advertisement message, stop the advertisement timer C17 and abandon a packet held in accumulation units C15-1~C15-n if any. Hereafter, the standby device in question will execute only activeness/non-activeness monitoring based on advertisement message reception from the working and the head standby devices.

Next, at Step SD4, compare the priority of the advertisement message and priority of the head standby device recorded in the monitoring unit C13. If the priority included in the advertisement message is higher than the priority of the head standby device currently recorded (Yes side), update the recording of the monitoring unit C13 in order to replace the transmission source of the advertisement message with the head standby device (Step SD5). If the priority of the advertisement message is lower (No side), which means that the advertisement transmission source is not the head, end the processing here.

Next, when the transmission source of the advertisement message is not a standby device whose priority is higher than that of the device itself (No side at SD2), if the transmission source is the working device at Step SD6 (Yes side), execute advertisement message reception processing assuming that the device itself is a head standby device. More specifically, abandon packets held in the accumulation units C15-1~C15-n by the same procedure as that of the first embodiment at Step SD7.

Then, at Step SD5, reset the relevant monitoring timer C14 to an initial value according to a received advertisement message and record the priority and standby flag information contained in the advertisement message to end the processing of receiving an advertisement from the working and the head standby devices.

Next, the transmission source of the advertisement message being neither the working device nor a standby device having high priority (No at Step SD6) indicates that the priority of the advertisement message transmission source is less than that of the device itself. In this case, end the operation without executing any additional processing in particular.

Next, description will be made of processing executed when a received packet is not an advertisement message (No side at SD1). At Step SD8, branch processing according to whether the reception mode of the interface units C11-1~C11-n is to receive only an advertisement message or receive all the packets.

In a case of the operation mode of receiving only an advertisement message (Yes side at SD8), abandon all the packets other than the advertisement message at Step SD9 to end the processing.

In a case of the operation mode of receiving all the packets (No side at SD8), branch the processing according to whether the packet is to be transferred or other at Step SD10. When the packet is a target of transfer (Yes side), execute the processing in the same manner as that of the case of the first embodiment (SD11, SD12).

When the packet is not a target of transfer (No side at SD10), which indicates that the packet is to be received by the device itself but not an advertisement message, transfer the packet to other protocol reception processing at Step SD13 to end the processing.

The foregoing realizes such packet reception processing of the standby device as executes accumulation processing when the standby device has the highest priority, and stops transmission and accumulation processing of an advertisement message and receives only an advertisement message from the working device and the standby device with the highest priority when the device has other priority.

Next, activeness/non-activeness monitoring processing in the present embodiment will be described.

Figure 16:
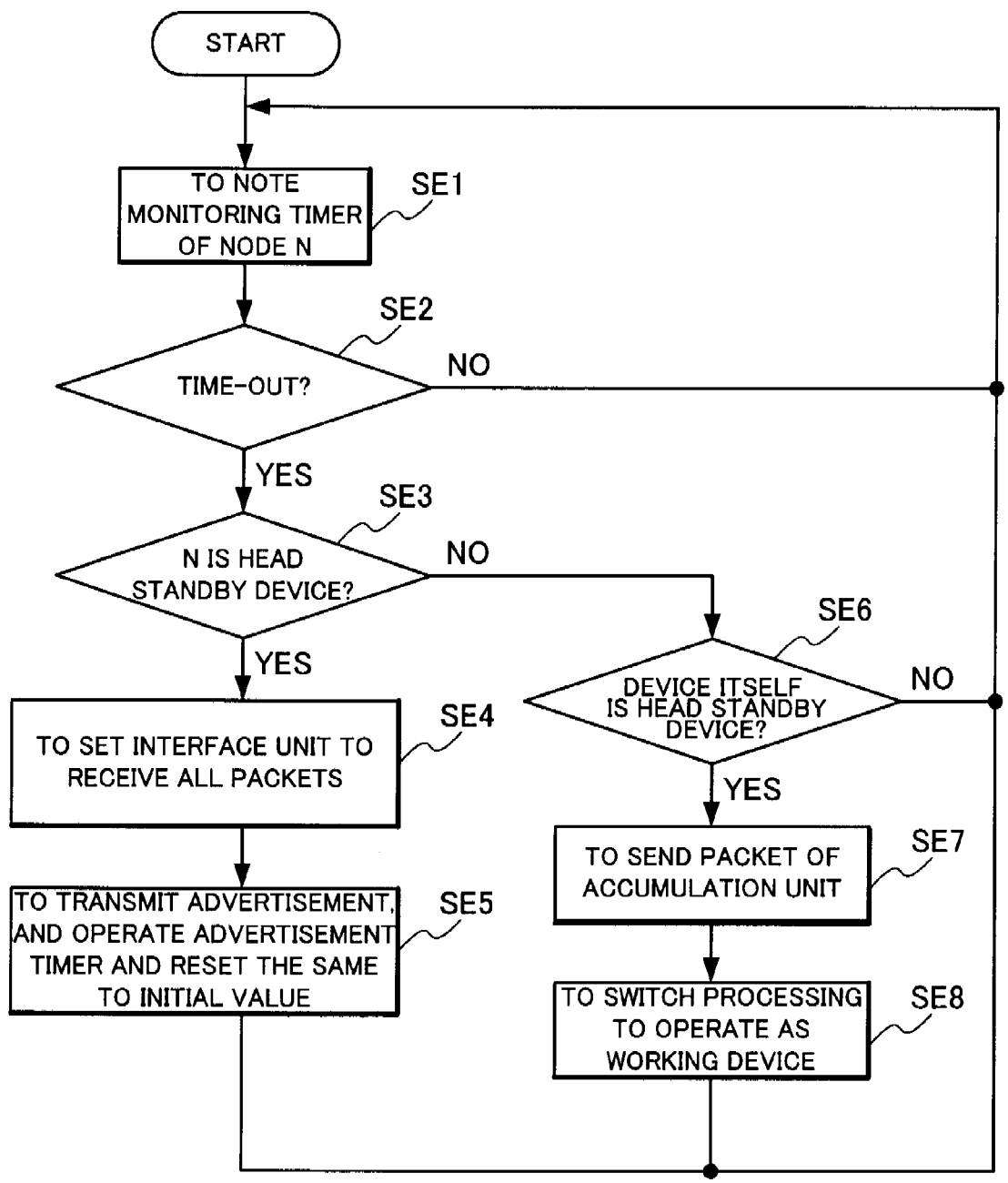
FIG. 16 is a flow chart showing one example of activeness/inactiveness monitoring processing at the standby device in the fourth embodiment of the present invention.

FIG. 16 is a flow chart showing operation of monitoring activeness/non-activeness of the standby devices C1~Cm in the present embodiment. The standby devices C1~Cm, the working and the head standby devices, each includes the monitoring timer C14 with respect to each advertisement message transmission source. The processing shown in FIG. 16 is illustrated to be common to them and in practice, the processing is executed individually for the working and the head standby devices. Although executing activeness/non-activeness monitoring of the head standby device by the head standby device itself is meaningless, illustration is made that the head standby device executes the same operation for the simplification of the procedure.

First at Step SE1, note the monitoring timer C14 whose advertisement message transmission source is a device N. At Step SE2, examine whether the timer times out or not and if it times out (Yes side), further examine an operation mode of the device N at Step SE3. When what times out is the monitoring timer C14 of the head standby device (Yes side), the device itself might become the head standby device next. Accordingly, switch the reception mode of the interface units C11-1~C11-n to receive all the packets at Step SE4 and transmit an advertisement message at Step SE5. In addition, for starting continuous transmission of an advertisement message, operate the advertisement timer C17 to reset the value to an initial value.

In a cases where when nonetheless the device itself starts operation as a head standby device by the procedure of Steps SE3~SE5, other standby devices have priorities set to be higher, the device itself stops the processing as a head standby device by the procedure of Steps SD2~SD3 in FIG. 15, so that a plurality of devices will never continue operation as a head standby device.

Next, when the timing out monitoring timer C14 is not the head standby device (No side at SE3), it is the monitoring timer C14 for the working device. In this case, first determine whether the device itself is a head standby device at Step SE6. The determination is made based on whether the advertisement timer C17 is in operation or not and whether the interface units C11-1~C11-n are in the mode of receiving all packet. If the device itself is a head standby device (Yes side), because itself executes packet accumulation processing, discharge the packets held in the accumulation units C15-1~C15-n at Step SE7 and switch the operation mode to that for the working device at Step SE8.

Next, when the device itself is not a standby device having the highest priority (No side at SE6), execute no operation in particular because itself accumulates no packet.

The foregoing enables a redundant packet switching system having a plurality of standby devices to be formed.

Next, effects of the fourth embodiment will be described.

The present embodiment enables packet switching processing to be continued even when a working device stops and also enables redundancy to be maintained. The reason is that when the working device stops, the head standby device newly behaves as a working device to continue packet switching processing and a standby device having higher priority newly behaves as a head standby device among the remaining standby devices.

The amount of processing of the standby devices other than the head standby device can be reduced. The reason is that when a head standby device is determined by the exchange of priority information by advertisement message transmission between standby devices, the standby devices other than the head standby device stop transmission of an advertisement message and refrain from accumulating further packets.

According to the present embodiment, however, the head standby device also needs to transmit an advertisement message, so that as compared with the first embodiment, traffic by an advertisement message is increased to make a processing procedure at each device complicated, resulting in costing more for realizing the device.

While in the present embodiment, the standby device according to the first embodiment is multiplexed, an embodiment is possible in which the standby devices according to the second and the third embodiments or according to the modification example of the third embodiment are multiplexed similarly to the present embodiment. Packets may be accumulated also in other standby devices than a head standby device.

Fifth Embodiment

Next, a redundant packet switching system according to a fifth embodiment of the present invention will be described.

In the first to fourth embodiments, in the accumulation unit of the standby device, all the packet to be transferred are accumulated irrespective of a protocol of a payload (hereinafter referred to as a higher layer protocol) carried out by a packet to be transferred.

While in such a protocol in which congestion is controlled at the time of re-transmission as TCP, prevention of packet missing at the system switchover of the redundant packet switching system produces great effects, there exists a protocol in which packet loss fails to exert great effects on performance such as RTP (Realtime Transport Protocol), for example.

The present embodiment therefore enables more efficient accumulation processing by examining a higher layer protocol of a packet to accumulate only a packet having a payload of a specific protocol.

Figure 17:
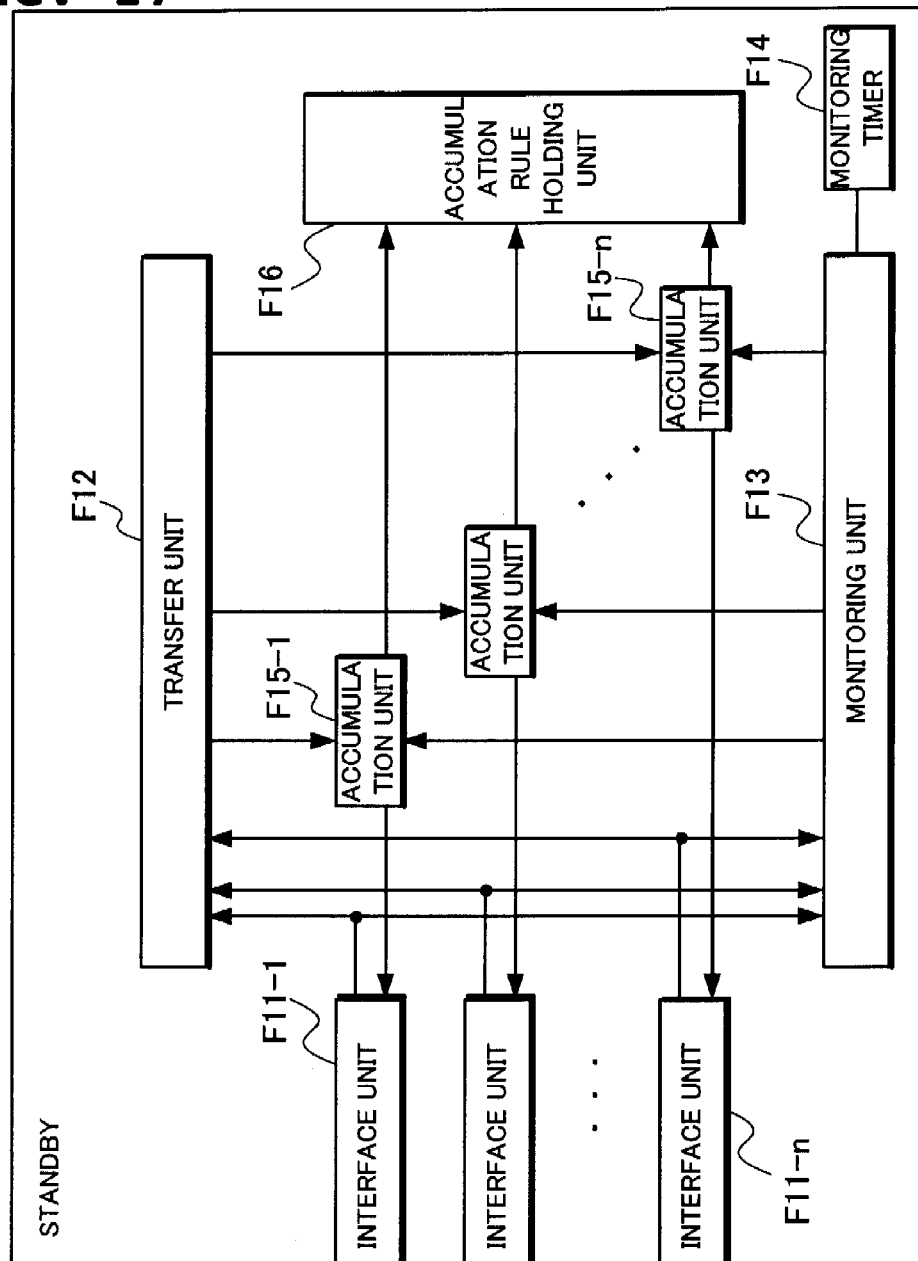
FIG. 17 is a block diagram of a fifth embodiment of the present invention.

With reference to FIG. 17, the redundant packet switching system according to the present embodiment differs from the redundant packet switching system according to the first embodiment shown in FIG. 5 in including a standby device F1 as a standby system packet switching device. A working system packet switching device of the redundant packet switching system according to the present embodiment is the same as the working device 51 shown in FIG. 5 and its illustration is omitted in FIG. 17.

The standby device F1 differs from the standby device 52 of the first embodiment in including an accumulation rule holding unit F16 whose accumulation rules can be referred to by accumulation units F15-1~F15-n. Recited in the accumulation rules are a kind of higher layer protocol (protocol identifier), and whether packet accumulation is allowed or not further for each kind of a port number with respect to a protocol having a port number such as TCP or UDP, and further for each kind of message type with respect to a protocol having a message type such as ICMP, and for each combination of these.

Next, operation of the present embodiment will be described.

In the present embodiment, when accumulating a packet to be transferred in the standby device F1, with reference to a header or a payload of the relevant packet, a higher layer protocol, a port number, a message type and the like are extracted and with reference to the accumulation rule holding unit F16 by the accumulation units F15-1~F15-n, determination is made whether the relevant packet is to be accumulated or not to hold one which can be accumulated and abandon the remaining.

Operation other than that described above is the same as that of the first embodiment.

Next, effects of the fifth embodiment will be described.

The present embodiment enables further reduction in the amount of packets accumulated in the accumulation units F15-1~F15-n than that in the first embodiment. The reason is that a higher layer protocol of a packet is examined to accumulate only a packet having a payload of a specific protocol.

In addition, a delay time in packet relay at the time of system switchover can be improved more than that in the first embodiment. The reason is that because the amount of packets accumulated in the accumulation units F15-1~F15-n is reduced, packet relay is immediately started when the standby system switches to the working system.

In a case of the present embodiment, however, it is necessary to examine a higher layer protocol of a packet when executing accumulation processing, so that the amount of processing will be larger than those of other embodiments.

While in the present embodiment, the standby device in the first embodiment is provided with the accumulation rule holding unit F16 to accumulate only a packet having a payload of a specific protocol, possible is an embodiment in which an accumulation rule holding unit is provided in the standby devices according to the second to fourth embodiments to accumulate only a packet having a payload of a specific protocol similarly to the present embodiment.

Although the embodiments of the present invention have been described in the foregoing, the present invention is not limited to the above embodiments but allows other various kinds of addition and modifications. In addition, the functions of the packet switching devices of the working system and the standby system of the present invention can be realized not only by hardware but also by a computer and a program. The program is provided as storage in a computer-readable recording medium such as a magnetic disc or a semiconductor memory and is read by a computer at the time of starting the computer to control operation of the computer, thereby causing the computer to function as each functional unit of the working system packet switching device (working device) and each functional unit of the standby system packet switching device (standby device) in each embodiment.

The present invention prevents missing of a packet to be transferred during system switchover of the redundant packet switching system with simple structure. The reason is that until next confirmation of operation of the packet switching device of the working system, the same packet as that of the packet switching device of the working system is held in the accumulation unit of the packet switching device of the standby system and when operation of the packet switching device of the working system fails to be confirmed to determine that the operation stops, the packet switching device of the standby system sends out a packet held in the accumulation unit to operate as the working system thereafter, thereby transferring all the packets which might have been possibly transferred while the working system continues operation.

Further according to the present invention, packet missing during system switchover is prevented to enable degradation of performance of such a protocol as TCP which is largely affected by packet missing to be suppressed.

INDUSTRIAL APPLICABILITY

The present invention is applicable to a router device which forms an IP network, an access control device such as a firewall device having a router function and a VPN termination device such as an IPsec gateway.

The invention claimed is:

1. A redundant packet switching system, comprising:
a working system switching device; and
a standby system packet switching device,
wherein:
the working system switching device and the standby system packet switching device are connected to the same data link,
said standby system packet switching device comprises an accumulation unit which accumulates a packet received by the working system switching device for further transfer until operation of said working system packet switching device is confirmed, and
if stop in the operation of said working system packet switching device is detected, said standby system packet switching device transfers the packet accumulated in said accumulation unit and a newly received packet from said data link by becoming a working system instead of said working system switching device.

2. A redundant packet switching system, comprising:
a working system packet switching device; and
a standby system packet switching device,
wherein:
the working system switching device and the standby system packet switching device are connected to the same data link,
said working system packet switching device comprises:
a first interface unit which transmits and receives a packet to/from said data link,
a first transfer unit which analyzes the packet received from said data link through the first interface unit to further transmit the packet to said data link through said first interface unit on a sending-out route, and
an advertisement unit which transmits an advertisement message to said data link, through said first interface unit in a predetermined cycle, indicating that the working system packet switching device is in operation,
said standby system packet switching device comprises:
a second interface unit which transmits and receives the packet to/from said data link,
an accumulation unit which temporarily accumulates the packet to be transmitted to said data link through the second interface unit,
a second transfer unit which analyzes the packet received from said data link through said second interface unit, the packet being the same packet received by the working system switching device, to further transfer the packet to said accumulation unit, and
a monitoring unit which abandons the packet accumulated in said accumulation unit if said advertisement message is received through said second interface unit, and if the advertising message is not received within a predetermined period, transmits the packet accumulated in said accumulation unit and a newly received packet from said data link through said second interface unit to said data link through said second interface unit on the sending-out route by becoming a working system instead of said working system switching device.

3. A redundant packet switching system, comprising:
a working system packet switching device; and
a standby system packet switching device link, wherein:
the working system switching device and the standby system packet switching device are connected to the same data link,
said working system packet switching device comprises:
a first interface unit which transmits and receives a packet to/from said data link,
a first transfer unit which analyzes the packet received from said data link through the first interface unit to further transmit the packet to said data link through said first interface unit on a sending-out route, and
an advertisement unit which transmits an advertisement message to said data link through said first interface unit indicating that the working system packet switching device is in operation, and
said standby system packet switching device comprises:
a second interface unit which transmits and receives the packet to/from said data link,
an accumulation unit which temporarily accumulates the packet received from said data link through the second interface unit with information about a reception time added,
a monitoring unit which abandons the packet accumulated in said accumulation unit whose reception time is before a calculated value if the advertisement message from said working system packet switching device is received through said second interface unit, where the calculated value is a time obtained by subtracting from a reception time of said advertisement message a time period required for transfer processing of said working system packet switching device, and if the advertisement message is not received within a predetermined period, said standby system packet switching device becomes a working system instead of the working system switching device, and
a second transfer unit which analyzes the packet accumulated in said accumulation unit when the standby packet switching device becomes the working system and a newly received packet from said data link through said second interface unit to further transfer the packet to said second interface unit on the sending-out route.

4. The redundant packet switching system according to claim 2 or claim 3, wherein said standby system packet switching device further comprises a packet monitoring unit which monitors a frame transferred to said data link by said working system packet switching device to delete the same packet, as the packet in the transferred frame, from said accumulation unit.

5. The redundant packet switching system according to claim 2 or claim 3, wherein:
said standby system packet switching device comprises a second advertisement unit which transmits an advertisement message indicating that the standby system packet switching device is in operation to said data link through said second interface unit in a predetermined cycle,
the redundant packet switching system further comprises at least one other packet switching device for monitoring the advertisement message from said standby system packet switching device, and
a packet switching device having highest priority from said other packet switching devices causes the packet switching device with the highest priority to operate as said standby system packet switching device when an advertisement message from said standby system packet switching device is not received in the predetermined period of time.

6. The redundant packet switching system according to claim 2 or claim 3, wherein said standby system packet switching device includes an accumulation rule holding unit for holding an accumulation rule for discriminating a packet to be accumulated in said accumulation unit and accumulates only a packet satisfying said accumulation rule.

7. A system switching method of a redundant packet switching system including a working system packet switching device and a standby system packet switching device which are connected to the same data link, the method comprising:
at said standby system packet switching device:
accumulating a packet for further transfer in an accumulation unit until operation of said working system packet switching device is confirmed, and
if stop in the operation of said working system packet switching device is detected, transferring the packet accumulated in said accumulation unit and a newly received packet from said data link by said standby system packet switching device which becomes working system instead of the said working system switching device.

8. A system switching method of a redundant packet switching system comprising a working system packet switching device and a standby system packet switching device which are connected to the same data link, the method comprising:
at said working system packet switching device:
analyzing a packet received from said data link through an interface unit which transmits and receives a packet to/from said data link; and
transmitting the packet to said data link through said interface unit on a sending-out route,
transmitting an advertisement message indicating that the working system packet switching device is in operation to said data link through said interface unit in a predetermined cycle, and
at said standby system packet switching device:
analyzing a packet received from said data link through said interface unit which transmits and receives a packet to/from said data link,
accumulating the packet for further transfer in said accumulation unit,
abandoning a packet accumulated in said accumulation unit if said advertisement message is received through said interface unit,
if said advertisement message is not received within a predetermined period, switching the standby packet switching device to a working system instead of the working system packet switching device, and
transmitting the packet accumulated in said accumulation unit and a newly received packet from said data link through said interface unit to said data link through said interface unit on a sending-out route.

9. A system switching method of a redundant packet switching system comprising a working system packet switching device and a standby system packet switching device which are connected to the same data link, the method comprising:
at said working system packet switching device:
analyzing a packet received from said data link through a first interface unit which transmits and receives a packet to/from said data link and transmitting the packet to said data link through said first interface unit on a sending-out route, transmitting an advertisement message indicating that the working system packet switching device is in operation to said data link through said first interface unit in a predetermined cycle, and at said standby system packet switching device:

accumulating the packet received from said data link through a second interface unit which transmits and receives the packet to/from said data link with information about a reception time added to the packet, abandoning the packet whose reception time is before a calculated value if the advertisement message is received from the working system packet switching device, where the calculated value is a time obtained by subtracting from a reception time of said advertisement message a time period required for transfer processing of said working system packet switching device, and if the advertisement message is not received within a predetermined period of time, said standby packet switching device becomes a working system instead of the working system switching device, and analyzing the packet accumulated in said accumulation unit and a newly received packet from said data link through said second interface unit to further transfer to said second interface unit on a sending-out route.

10. The system switching method of a redundant packet switching system according to claim 8 or claim 9, wherein said standby system packet switching device monitors a frame transferred to said data link from said working system packet switching device to delete the same packet, as the packet in the transferred frame, from said accumulation unit.

11. The system switching method of a redundant packet switching system according to claim 8 or claim 9, wherein:

said standby system packet switching device transmits an advertisement message indicating that the standby system packet switching device is in operation to said data link through said second interface unit, at least one other packet switching device monitors the advertisement message from said standby system packet switching device, and a packet switching device having highest priority from said other packet switching devices causes the packet switching device with the highest priority to operate as said standby system packet switching device when an advertisement message from said standby system packet switching device is not received in the predetermined period of time.

12. The system switching method of a redundant packet switching system according to claim 8 or claim 9, wherein said standby system packet switching device determines whether packet accumulation into said accumulation unit is allowed or not with reference to an accumulation rule for discriminating a packet to be accumulated which is held in an accumulation rule holding unit.

13. A standby system packet switching device comprising:

an accumulation unit which accumulates a packet received by a working system packet switching device provided in a redundant packet switching system for further transfer until operation of a said working system packet switching device is confirmed;

a detection unit which detects whether an operation of said working system packet switching device is stopped; and a transfer unit which transfers the packet accumulated in said accumulation unit and a newly received packet from said data link by becoming a working system instead of said working system packet switching device if the detection unit detects the stop in the operation of said working system packet switching device.

14. A packet switching device, comprising:

an interface unit which transmits and receives a packet to/from a data link to which a working system packet switching device is connected, an accumulation unit which temporarily accumulates a packet to be transmitted to said data link through the interface unit, a transfer unit which analyzes a packet received from said data link through said interface unit to further transfer the packet in said accumulation unit, and a monitoring unit which abandons the packet accumulated in said accumulation unit when an advertisement message, periodically transmitted to said data link from said working system packet switching device through said interface unit, is received; and if the advertising message is not received within a predetermined period, transmitting the packet accumulated in said accumulation unit and a newly received packet from said data link through said interface unit to said data link through said interface unit on a sending-out route by having the packet switching device become a working system instead of said working system switching device.

15. A packet switching device, comprising:

an interface unit which transmits and receives a packet to/from a data link to which a working system packet switching device is connected, an accumulation unit which temporarily accumulates the packet received from said data link through the interface unit together with information about a reception time of the packet, a monitoring unit which abandons the packet whose reception time is before a calculated value if an advertisement message transmitted from said working system packet switching device is received, where the calculated value is a time obtained by subtracting from a reception time of said advertisement message a time period required for transfer processing of said working system packet switching device, and the packet switching device becomes a working system instead of said working system switching device if the advertising message is not received within a predetermined period, and a transfer unit which analyzes the packet accumulated in said accumulation unit if the packet switching device becomes the working system and a newly received packet from said data link through said interface unit to further transfer the packets to said interface unit on a sending-out route.

16. The packet switching device according to claim 14 or claim 15, further comprising a packet monitoring unit which monitors a frame transferred to said data link by said working system packet switching device to delete the same packet as a packet in the transferred frame, from said accumulation unit.

17. The packet switching device according to claim 14 or claim 15, which exchanges priority information with other standby system packet switching device and only when the packet switching device has the highest priority among standby system packet switching devices, switches operation to behave as the working system if an operation of said working system packet switching device is stopped.

18. The packet switching device according to any one of claim 14 or claim 15, comprising an accumulation rule holding unit which holds an accumulation rule for discriminating a packet to be accumulated in said accumulation unit, wherein only a packet satisfying said accumulation rule is accumulated.

19. A non-transitory computer-readable storage medium on which is encoded a program of machine-readable instructions running on a computer which forms a standby system packet switching device including an accumulation unit for temporarily accumulating a packet to be transmitted to a data link through an interface unit which transmits and receives a packet to/from said data link to which a working system packet switching device is connected, said instructions comprising the functions of:
 a transfer function of analyzing a packet received from said data link through said interface unit to output a packet as a target of transfer to said accumulation unit, and
 a monitoring function of abandoning a packet accumulated in said accumulation unit at every reception of an advertisement message periodically transmitted to said data link from said working system packet switching device through said interface unit, and upon sensing that reception of said advertisement message ceases, switching the packet switching device itself to the working system to transmit a packet accumulated in said accumulation unit and a packet newly received from said data link through said interface unit to said data link through said interface unit on a sending-out route.

20. A non-transitory computer-readable storage medium on which is encoded a program of machine-readable instructions running on a computer which forms a standby system packet switching device including an accumulation unit for temporarily accumulating a packet received from a data link through an interface unit which transmits and receives a packet to/from said data link to which a working system packet switching device is connected with information about a reception time added, said instructions comprising the functions of:
 a monitoring function of abandoning at every reception of an advertisement message periodically transmitted from said working system packet switching device through said interface unit, a packet whose reception time is before a time obtained by going back from a reception time of said advertisement message by a time period required for transfer processing of said working system packet switching device among packets accumulated in said accumulation unit, and upon sensing that reception of an advertisement message ceases, switching the packet switching device itself to the working system, and
 a transfer function of analyzing a packet accumulated in said accumulation unit when the packet switching device itself switches to the working system and a packet newly received from said data link through said interface unit to output a packet as a target of transfer to said interface unit on a sending-out route.

21. The program according to claim 19 or claim 20, further comprising a packet monitoring function of monitoring a frame sent out to said data link by said working system packet switching device to delete the same packet as a packet as a target of transfer which is stored in said frame from said accumulation unit.

22. The program according to claim 19 or claim 20, further comprising a function of exchanging priority information with other standby system packet switching device and only when the packet switching device itself has the highest priority among standby system packet switching devices, switching operation to behave as a working system packet switching device at an operation stop of said working system packet switching device.

23. The program according to any one of claim 19 or claim 20, further comprising a function of accumulating only a packet satisfying an accumulation rule for discriminating a packet to be accumulated which is held in an accumulation rule holding unit.

24. A redundant packet switching system comprising:
 a working system packet switching device; and
 a standby system packet switching device,
 wherein:
  the working system packet switching device and the standby system packet switching device are connected to the same data link,
  said working system packet switching device comprises: an advertisement unit which transmits an advertisement message indicating that the working system packet switching device is in operation to said data link in a predetermined cycle, and
  said standby system packet switching device comprises:
   an accumulation unit which temporarily accumulates a packet to be transmitted to said data link,
   a transfer unit which analyzes a packet received from said data link to transfer to said accumulation unit, and
   a monitoring unit which abandons the packet accumulated in said accumulation unit if said advertisement message is received, and if said advertisement message is not received within the predetermined cycle, becoming a working system instead of said working system switching device and transmitting the packet accumulated in said accumulation unit and a newly received packet from said data link to said data link.

25. A redundant packet switching system comprising:
 a working system packet switching device; and
 a standby system packet switching device,
 wherein:
  the working system packet switching device and the standby system packet switching device are connected to the same data link,
  said working system packet switching device comprises an advertisement unit which transmits an advertisement message indicating that the working system packet switching device is in operation to said data link in a predetermined cycle, and
  said standby system packet switching device comprises:
   an accumulation unit which temporarily accumulates a packet received from said data link with information about a reception time added to the packet,
   a monitoring unit which abandons the packet whose reception time is before a calculated value if an advertisement message from said working system packet switching device is received, where the calculated value is time obtained by subtracting from a reception time of said advertisement message a time period required for transfer processing by said working system packet switching device, and if the advertisement message is not received within the predetermined cycle, the packet switching device becomes a working system instead of the working system packet switching device, and
   a transfer unit which analyzes the packet accumulated in said accumulation unit if the packet switching device becomes the working system and a newly received packet from said data link to output the packet for further transfer.

26. A redundant packet switching method, comprising:
receiving at least one data packet by a first switching device and a second switching device, where the first switching device is an active device and the second switching device is a standby device;
storing the at least one packet in the first switching device for further transmission in a system and in an accumulation unit of the second switching device;
deleting the at least one packet from the accumulation unit if a message is received from the first switching device; and
transmitting the at least one packet stored in the accumulation unit and switching the second switching device to active if the message is not received from the first switching device in a predetermined period of time.

27. The redundant packet switching method according to claim 26, wherein the at least one packet is stored in the accumulation unit together with a reception time of the respect packet and wherein the deleting comprises selectively deleting packets based on the reception time of the respective packet and processing time in the first switching device.

28. The redundant packet switching method according to claim 26, further comprising:
monitoring by the second switching device whether at least one packet is further transmitted by the second switching device; and
deleting a copy of the further transmitted packets from the accumulation unit.

29. The redundant packet switching method according to claim 26, wherein the storing in the accumulation unit comprises storing for different period of times different packets based on type of protocol.

30. The redundant packet switching method according to claim 29, further comprising:
determining whether the packet stored in the accumulation unit is a TCP protocol packet;
if the stored packet is not the TCP protocol packet, monitoring by the second switching device packets whether the at least one packet is further transmitted by the second switching device; and deleting a copy of the further transmitted packets from the accumulation unit.

* * * * *